(12) United States Patent
Ito et al.

(10) Patent No.: US 11,974,058 B2
(45) Date of Patent: Apr. 30, 2024

(54) IMAGE CAPTURING APPARATUS AND CONTROL METHOD THEREOF

(71) Applicant: CANON KABUSHIKI KAISHA, Tokyo (JP)

(72) Inventors: Shigeyoshi Ito, Tokyo (JP); Takashi Gyotoku, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 141 days.

(21) Appl. No.: 17/679,205

(22) Filed: Feb. 24, 2022

(65) Prior Publication Data

US 2022/0279141 A1    Sep. 1, 2022

(30) Foreign Application Priority Data

Feb. 26, 2021    (JP) .................. 2021-030627

(51) Int. Cl.
*H04N 25/75*     (2023.01)
*H04N 23/73*     (2023.01)
*H04N 23/75*     (2023.01)
*H04N 25/42*     (2023.01)

(52) U.S. Cl.
CPC ............. *H04N 25/75* (2023.01); *H04N 23/73* (2023.01); *H04N 23/75* (2023.01); *H04N 25/42* (2023.01)

(58) Field of Classification Search
None
See application file for complete search history.

(56) References Cited

U.S. PATENT DOCUMENTS

2020/0162673 A1\*   5/2020   Kanda .................. H04N 25/778

FOREIGN PATENT DOCUMENTS

JP       2004-080230 A      3/2004
JP        5251684 B2        7/2013

\* cited by examiner

*Primary Examiner* — Mark T Monk
(74) *Attorney, Agent, or Firm* — Cowan, Liebowitz & Latman, P.C.

(57) ABSTRACT

An image capturing apparatus comprising: an actuator that actuates an image sensor; a storage; an image processor that processes the image signal read out from the image sensor; and a controller that controls the actuator, the storage and the image processor by selectively using a plurality of operation modes. The plurality of operation modes includes a first operation mode of performing, at a predetermined first cycle, a first operation in which a first image signal is read out from the image sensor and processed by the image processor, and selectively performing a second operation in which a second image signal is read out from the image sensor and stored in the storage or a third operation in which the stored second image signal is read out from the storage and processed by the image processor.

14 Claims, 13 Drawing Sheets

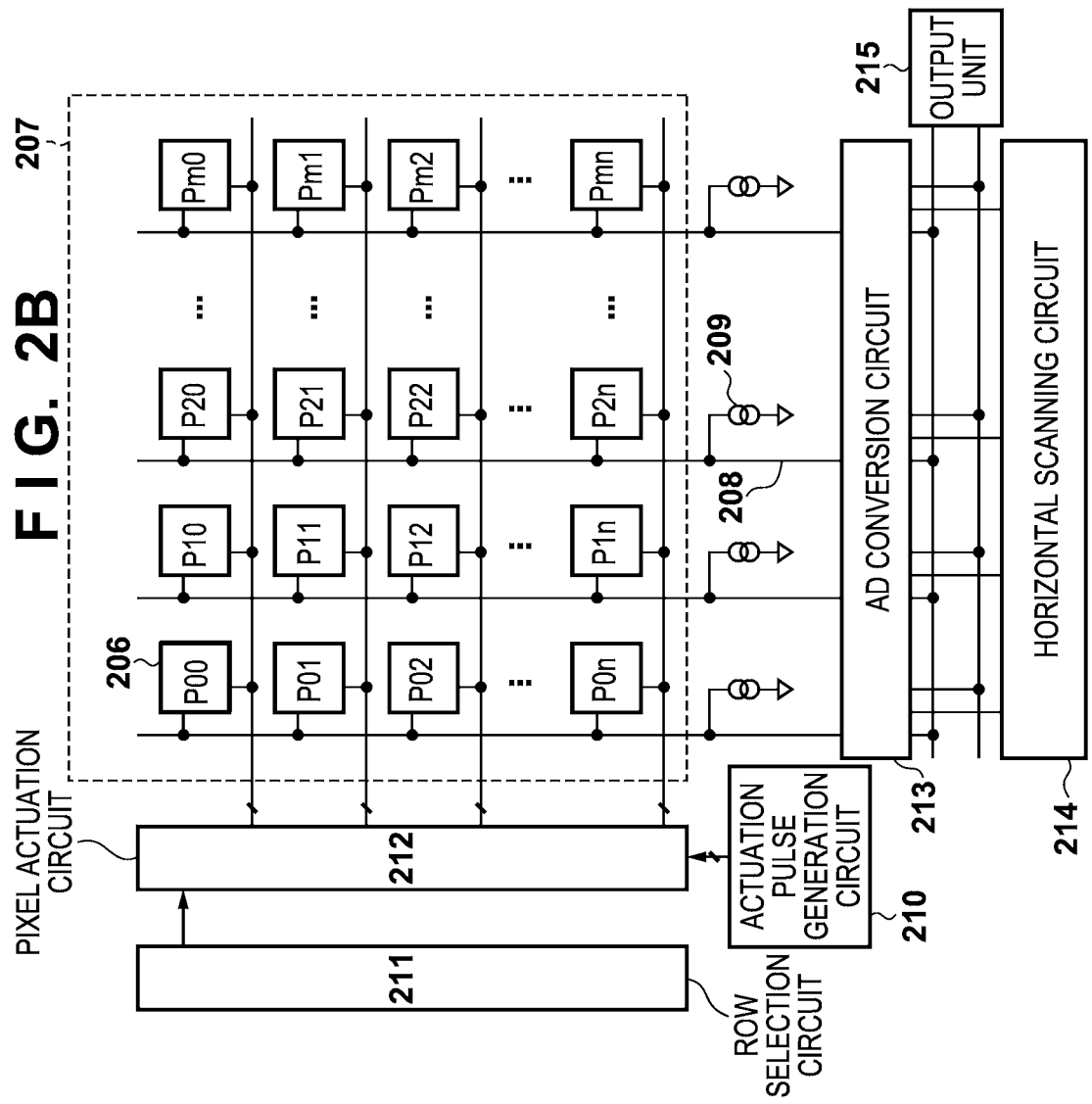
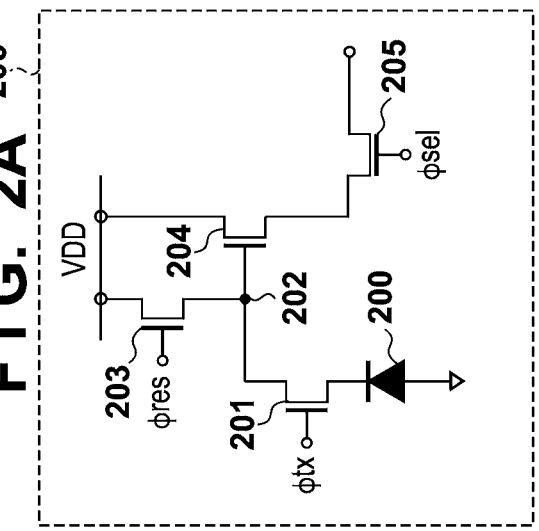

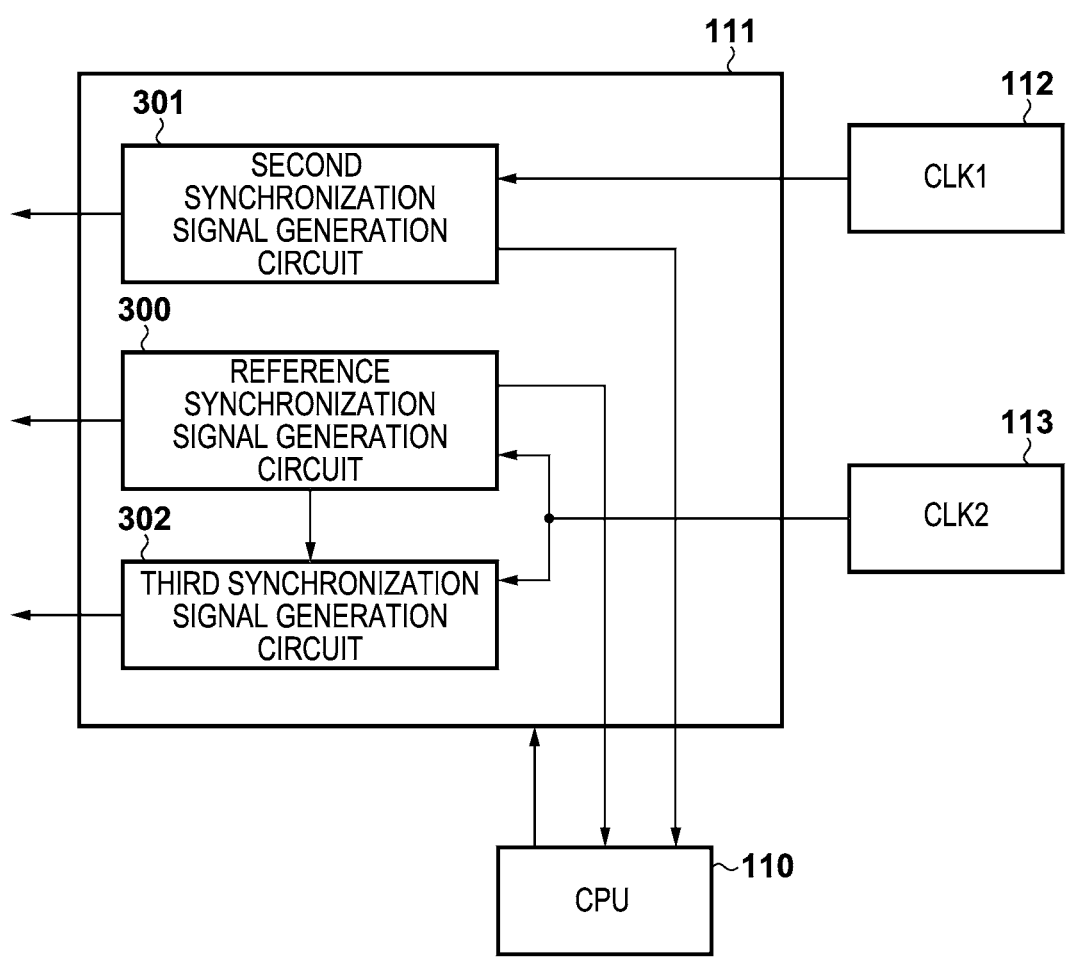
F I G. 3

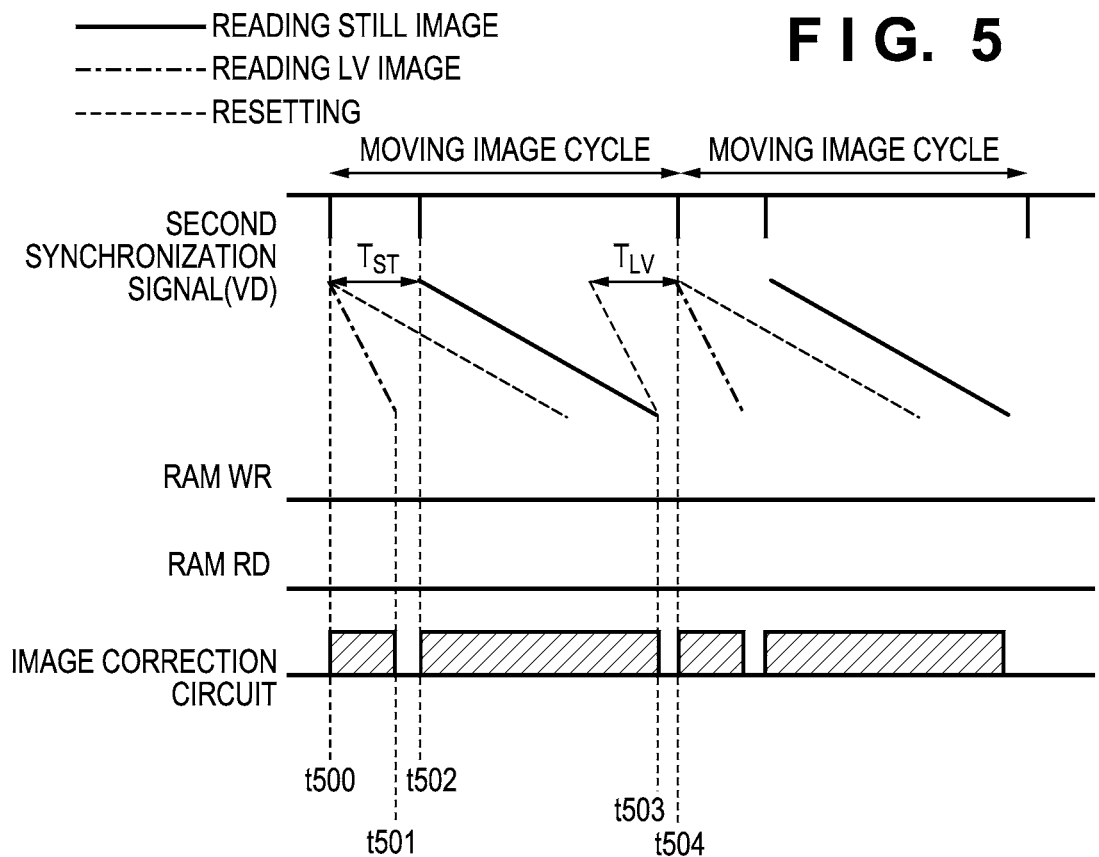
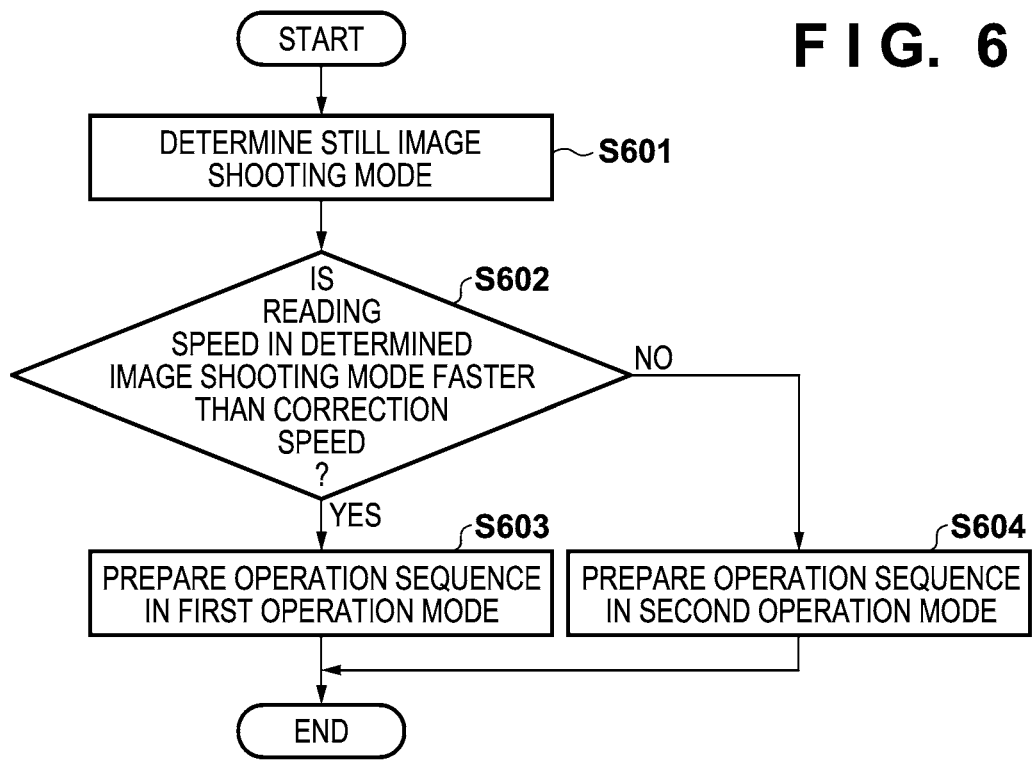

IMAGE CAPTURING APPARATUS AND CONTROL METHOD THEREOF

BACKGROUND OF THE INVENTION

Field of the Invention

The present invention relates to an image capturing apparatus and a control method thereof, and particularly to a timing control of shooting still images and images to be displayed and of correcting images.

Description of the Related Art

Some digital cameras and electronic devices having a camera function (collectively referred to as "image capturing apparatuses", hereinafter) have a live view (LV) function. The LV function is a function of shooting a moving image and sequentially displaying the obtained image of each frame (hereinafter referred to as "LV image") on a display unit in parallel with the shooting. The user can make adjustments on the shooting region in still image shooting and moving image shooting while checking the displayed LV images. Hereinafter, this adjustment operation of the shooting region is referred to as "framing".

It is important to make framing easy for a user in order to shoot an image as the user intended. The index of easiness of framing is called "framing performance", hereinafter. For example, if the time (display delay) from shooting an LV image to displaying it on the display unit is long, the subject may have already moved to a different position at the timing when the subject is displayed on the display unit. In such a case, the framing performance deteriorates. Thus, the display delay greatly affects the framing performance.

In an image capturing apparatus that provides the LV function for performing framing and captures a still image, framing becomes impossible when performing continuous shooting of still images unless the LV images are sequentially displayed on the display unit even during the continuous shooting of still images is performed. Therefore, in order to continuously shoot still images while sequentially displaying LV images, it is necessary to switch between shooting of still images and shooting of LV images.

After shooting, it is necessary to perform correction processing on both the still image and the LV image, and since the amount of data of the still image is large, the correction processing of the still image takes time. If the correction processing is performed in the order of shooting, the correction processing of the still image may continue even while the LV image is being shot. As a result, the correction processing of the LV image may be delayed, the time required from taking the LV image to displaying it on the display unit may become long, the display delay of the LV image may become large, and the framing performance may deteriorate.

To solve this problem, Japanese Patent No. 5251684 discloses, in an image processing apparatus in which still image data and moving image data are input and subjected to data processing, a method in which, while the moving image data is displayed at a predetermined cycle, a still image is divided into parts and corrected part by part in between processing the moving image data over several frames.

Further, Japanese Patent Laid-Open No. 2004-80230 discloses a method in which one of a plurality of images obtained by continuous shooting is selected to determine the development parameters, and the plurality of images obtained by continuous shooting are developed using the same parameters.

However, in the prior arts disclosed in Japanese Patent No. 5251684 and Japanese Patent Laid-Open No. 2004-80230 described above, it is not possible to take LV images so as not to deteriorate the framing performance while taking still images. Further, since the still images must be corrected over the blanking periods of the LV image shooting for the number of parts of the still image, there is a problem that the shooting frame rate of the still images is lowered.

SUMMARY OF THE INVENTION

The present invention has been made in consideration of the above situation, and by appropriately controlling the shooting timings and correction timings of still images and LV images, still images are taken while suppressing deterioration of framing performance.

According to the present invention, provided is an image capturing apparatus comprising at least one processor and/or circuitry which functions as: an actuator that actuates an image sensor; a storage that stores an image signal read out from the image sensor; an image processor that processes the image signal read out from the image sensor; and a controller that controls the actuator, the storage and the image processor by selectively using a plurality of operation modes, wherein the plurality of operation modes includes a first operation mode of performing, at a predetermined first cycle, a first operation in which a first image signal is read out from the image sensor by the actuator and processed by the image processor, and selectively performing a second operation in which a second image signal is read out from the image sensor by the actuator at a timing different from the first operation and stored in the storage or a third operation in which the stored second image signal is read out from the storage and processed by the image processor.

Further, according to the present invention, provided is a control method of an image capturing apparatus comprising at least one processor and/or circuitry which functions as an actuator that actuates an image sensor, a storage that stores an image signal read out from the image sensor, an image processor that processes the image signal read out from the image sensor, the method comprising controlling the actuator, the storage and the image processor by selectively using a plurality of operation modes, wherein in a first operation mode included in the plurality of operation modes, a first operation in which a first image signal is read out from the image sensor by the actuator and processed by the image processor is performed at a predetermined first cycle, and a second operation in which a second image signal is read out from the image sensor by the actuator at a timing different from the first operation and stored in the storage or a third operation in which the stored second image signal is read out from the storage and processed by the image processor is selectively performed.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 2A is a circuit diagram of a pixel unit according to the first and third embodiments.

FIG. 2B is a block diagram showing a circuit configuration of an image sensor according to the first to third embodiments.

FIG. 3 is a block diagram showing a configuration of a timing pulse generation circuit according to the first to third embodiments.

FIG. 5 is a timing chart according to a second operation mode in the first embodiment.

FIG. 6 is a flowchart showing a control for switching a shooting mode in the first embodiment.

DESCRIPTION OF THE EMBODIMENTS

Figure 1:
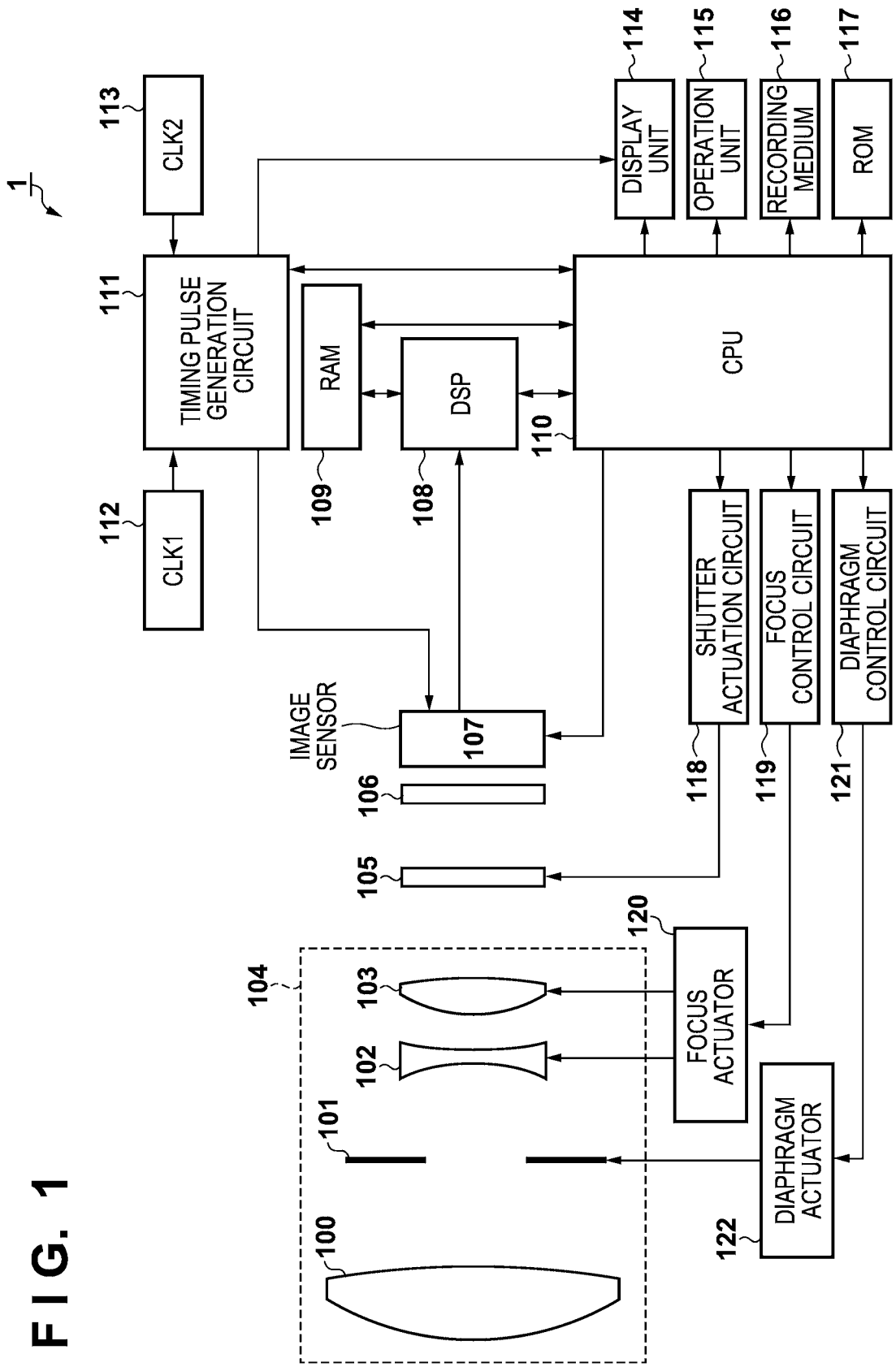
FIG. 1 is a block diagram showing a configuration of an image capturing apparatus according to first to third embodiments of the present invention.

Hereinafter, embodiments will be described in detail with reference to the attached drawings. Note, the following embodiments are not intended to limit the scope of the claimed invention, and limitation is not made an invention that requires a combination of all features described in the embodiments. Two or more of the multiple features described in the embodiments may be combined as appropriate. Furthermore, the same reference numerals are given to the same or similar configurations, and redundant description thereof is omitted.

FIG. 1 is a block diagram showing a configuration of an image capturing apparatus 1 according to an embodiment of the present invention. In FIG. 1, a first lens 100 is arranged at the tip of an imaging optical system 104. A diaphragm 101 is driven by a diaphragm actuator 122 and the aperture diameter thereof is adjusted to adjust the amount of light at the time of shooting. A second lens 102 and a third lens 103 are driven by a focus actuator 120 and move back and forth in the optical axis direction so as to adjust the focus of the imaging optical system 104.

A focal plane shutter 105 has a function of adjusting an exposure period when shooting a still image. However, when the electronic shutter is used for adjusting the exposure period by performing slit rolling readout in an image sensor 107, the exposure period is not adjusted by the focal plane shutter 105. An optical low-pass filter 106 is used to reduce false colors and moire in captured images.

The image sensor 107 photoelectrically converts an optical image of a subject formed by the imaging optical system 104 into an electric signal (image signal). In addition, the image sensor 107 has an electronic shutter function, and is able to capture an image signal by performing the slit rolling reading.

A digital signal processor (DSP) 108 receives an image signal from the image sensor 107 and performs predetermined image processing. In addition to image processing, the DSP 108 calculates information to be used to drive the focus lens (the second lens 102 and the third lens 103) based on information from the image sensor 107.

A RAM 109 has a function of storing image data having undergone predetermined image processing by the DSP 108 and a function as a work memory when a CPU 110 operates. It should be noted that other types of memory can be used as long as the access speed is sufficiently high and the memory is at a level that does not cause any operational problem. Further, in the present embodiment, the RAM 109 is arranged outside the DSP 108 and the CPU 110, but a part or all of the functions thereof may be built in the DSP 108 and/or the CPU 110.

The CPU 110 executes a program for controlling each part of the image capturing apparatus 1 and comprehensively controls the operation of the image capturing apparatus 1. The CPU 110 can control readout of image signals from the image sensor 107 by making various settings on the image sensor 107. Further, the CPU 110 communicates with a timing pulse generation circuit 111, and controls generation timings of various timing pulses for controlling the operation of each module as described later.

The timing pulse generation circuit 111 generates a plurality of synchronization signals based on a clock signal CLK1 from a first clock 112 and a clock signal CLK2 from a second clock 113, and supplies them to the image sensor 107 and a display unit 114. The image sensor 107 performs an image shooting operation by operating in synchronization with the signals from the timing pulse generation circuit 111.

In addition, the display unit 114 updates the displayed image by operating in synchronization with the signals from the timing pulse generation circuit 111. In the present embodiment, a plurality of clocks are input to the timing pulse generation circuit 111 to generate two types of synchronization signals, but the present invention is not limited to this configuration. Furthermore, the CPU 110 also has a function of controlling the focus actuator 120 and adjusting the focus of the imaging optical system 104 by using the calculation result output from the DSP 108.

The display unit 114 displays still images, moving images, menus, etc. generated by the DSP 108. A live view (LV images) successively displayed on the display unit 114 allows the user to perform framing of adjusting a shooting region in still image shooting and moving image shooting while checking the live view. As the display unit 114, a rear display as well as an electronic viewfinder (EVF) and the like are known. In FIG. 1, the configuration having only one display unit 114 is shown, but a configuration including both a rear display and an EVF may be used.

An operation unit 115 is composed of operation members such as buttons and levers, and includes a mode switching dial, a still image shooting button for instructing a still image shooting, and the like. It should be noted that the operation unit 115 may not have an operation member, and may be configured so that various instructions are input through a touch panel provided on a rear display. In addition, the user can perform shooting by controlling the CPU 110 through the operation unit 115.

When the CPU 110 detects that the user presses the still image shooting button, the CPU 110 controls to shoot a still image after a certain period of time including the still image shooting preparation period has elapsed. Further, if the still image shooting button is continuously pressed after shooting of a still image is started, continuous shooting of the still images is performed. The detailed operation related to the shooting of a still image/images will be described later using timing charts.

A recording medium 116 is detachably configured to record still image data and moving image data. A ROM 117 stores a program for the CPU 110 to control the operation of each part.

A shutter actuation circuit 118 controls and actuates the focal plane shutter 105. A focus control circuit 119 controls the focus actuator 120 based on the output of the CPU 110 to move the focus lens (the second lens 102 and the third lens 103) forward and backward in the optical axis direction to change the focus position. A diaphragm control circuit 121 controls the diaphragm actuator 122 to control the aperture of the diaphragm 101.

Next, the configuration of the image sensor 107 of the present embodiment will be described with reference to FIGS. 2A and 2B.

FIG. 2A is a diagram illustrating a detailed circuit configuration of a pixel unit 206 of the image sensor 107. A photodiode (PD) 200 photoelectrically converts the incident light and stores the generated electric charge. A transfer switch 201 is controlled by a control signal ϕtx, and by setting the control signal ϕtx to High (hereinafter referred to as "H"), the electric charge accumulated in the PD 200 is transferred to a floating diffusion unit (FD) 202.

A reset switch 203 is a switch for initializing the FD 202, and is controlled by a control signal ϕres. A pixel reset operation is realized by setting the control signals ϕtx and ϕres to H at the same time, thereby setting the PD 200 and FD 202 to a power supply voltage (VDD). When a control signal ϕsel of a selection switch 205 becomes H, a pixel amplifier transistor 204 is connected to a constant current source 209 via a vertical output line 208 to form a pixel amplifier. Then, the electric charge transferred from the PD 200 to the FD 202 is converted into a voltage value according to the amount of electric charge by the pixel amplifier, and is output to the vertical output line 208 as an image signal.

Next, the circuit configuration of the image sensor 107 will be described with reference to FIG. 2B.

In a pixel array 207, a plurality of pixel units 206 are arranged in a matrix of (m+1) in the horizontal direction (row direction) and (n+1) in the vertical direction (column direction). Both m and n are natural numbers. An actuation pulse generation circuit 210 generates pulse signals for resetting the pixel units 206 and for reading image signals from the pixel units 206 based on the synchronization signals from the timing pulse generation circuit 111.

The pulse signals generated by the actuation pulse generation circuit 210 are supplied to a pixel actuation circuit 212. A row selection circuit 211 selects the row to supply the pulse signals generated by the actuation pulse generation circuit 210 and sets the selected row in the pixel actuation circuit 212. The pixel actuation circuit 212 supplies the pulse signals generated by the actuation pulse generation circuit 210 to the row set by the row selection circuit 211 as the control signals described above.

The image signal is output to the vertical output lines 208 from the pixel units 206 of the row selected according to the control signals supplied from the pixel actuation circuit 212. Each constant current source 209 is coupled to the pixel amplifier transistor 204 to form a source follower circuit.

An AD conversion circuit (ADC) 213 converts the analog image signals (voltage values) output to the vertical output lines 208 into digital values according to their signal levels. The image signals converted into digital values by the ADC 213 are sequentially selected by a horizontal scanning circuit 214 and transferred to an output unit 215.

By changing the actuation method of the pixel array 207 by the row selection circuit 211, the image signals can be read out in a plurality of different ways. For example, in the present embodiment, as a reading method when generating a still image, after reading the image signals from the pixels in the top row, the image signals are read from the pixels in the next row, and reading of the image signals from the pixels in the next row is repeated until the bottom row is reached.

Further, as a reading method when generating a moving image, after reading the image signals from the pixels in the top row, the image signals are read from the pixels in the row several rows below the top row (for example, three rows below), and reading of the image signals from the row several rows below the previously read row is repeated until the bottom row is reached. If the image signals are read out in this way when generating a moving image, although the vertical resolution of the image is lowered, the image signals for one frame can be read in a short time and with low power consumption. In addition, it is possible to read out the image signals by various reading methods.

In this embodiment, an example in which the pixel actuation circuit 212 and the ADC 213 are built in the image sensor 107 has been described, however, these circuits may be provided on a chip different from a chip of the image sensor 107.

Next, the internal configuration of the timing pulse generation circuit 111 will be described with reference to FIG. 3. In the present embodiment, the timing pulse generation circuit 111 includes a reference synchronization signal generation circuit 300 (referred to as "reference SSG", hereinafter), a second synchronization signal generation circuit 301 (referred to as "second SSG", hereinafter), and a third synchronization signal generation circuit 302 (referred to as "third SSG", hereinafter).

The reference SSG 300 and the second SSG 301 are connected to the CPU 110 so that the time of the assertion timing of each synchronization signal can be recorded. From the recorded times, the time difference between the assertion timings of the reference SSG 300 and the second SSG 301 can be calculated. In addition, by changing the settings of each of these circuits by the CPU 110, it is possible to generate synchronization signals of various cycles, and it is also possible to change the generation timings of synchronization signals.

A second synchronization signal is output from the second SSG 301, and the timing of read scan of the image sensor 107 is controlled based on the second synchronization signal. Further, a third synchronization signal is output from the third SSG 302, and the timing of display scan of the display unit 114 is controlled based on the third synchronization signal.

Further, in this configuration, the second SSG 301 operates based on the clock signal CLK1 from the first clock 112, and the reference SSG 300 and the third SSG 302 operate based on the clock signal CLK2 from the second clock 113. However, the present invention is not limited to this configuration. All SSGs may be operated on the basis of a single clock signal or may be operated on the basis of different clock signals. In addition, all or independently part of the above SSGs may form a block.

First Embodiment

The first embodiment of the present invention will be described. The first embodiment describes two types of operation modes, a first operation mode and a second operation mode, in which continuous shooting of still images is performed while displaying LV images at different timings between the first and second operation modes.

Figure 4:
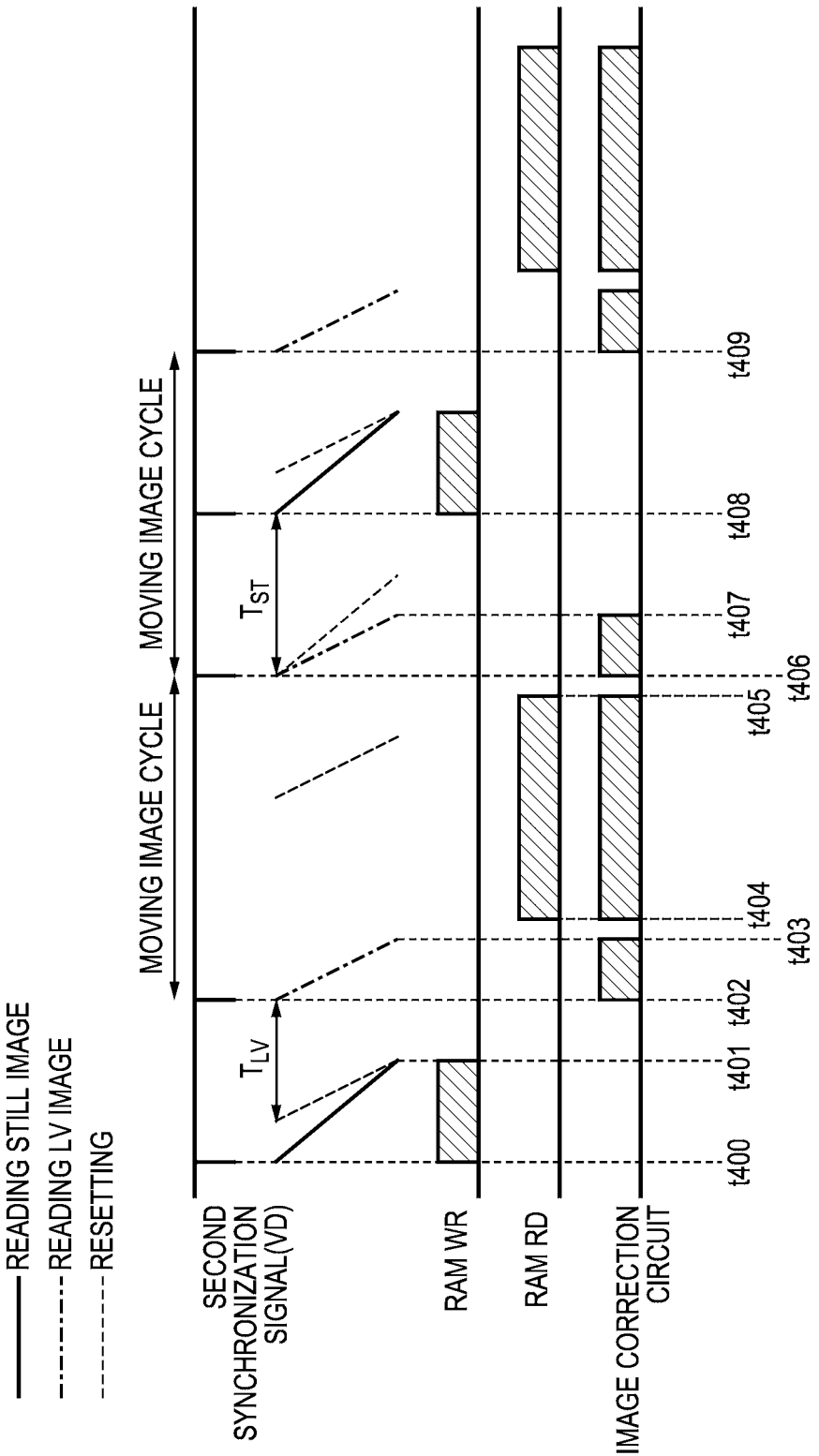
FIG. 4 is a timing chart according to a first operation mode in the first embodiment.

FIG. 4 is a timing chart showing a shooting operation in the first operation mode in the first embodiment. This operation is performed, for example, in response to a shooting instruction issued in response to the user pressing the still image shooting button provided in the operation unit 115. In the figure, the solid lines represent the read scan of the image sensor 107 for the still image signals, the dot-dash lines represent the read scan for the LV image signals, and the broken lines represent the reset scan of the image sensor 107. In addition, it is assumed that the still image signal is read out at a very high speed, and the time taken to correct the still image signal by the image correction circuit built in the DSP 108 is longer than the time taken to read out the still image signal.

At time t400, the second SSG 301 of the timing pulse generation circuit 111 asserts a second synchronization signal (vertical synchronization signal (VD)), and in synchronization with this, the image sensor 107 starts reading out a still image signal. It is assumed that the reset scan of the image sensor 107 is started at the time prior to time t400 by an exposure period (charge accumulation period) predetermined by photometry or user instruction. Then, at the same time as the reading of the still image signal is started, the read still image signal is transferred to the DSP 108 and stored in the RAM 109 connected to the DSP 108. When the reading of the still image signal is completed at time t401, the storage of the still image signal in the RAM 109 is also completed.

At time t402, the timing pulse generation circuit 111 asserts a second synchronization signal, and in synchronization with this, the image sensor 107 starts reading out an LV image signal. It should be noted that the reset scan of the image sensor 107 is started at the time prior to time t402 by an exposure period (charge accumulation period) predetermined by photometry or user instruction. The exposure period at this time is shorter than the time TLV in consideration of the timing of the end of reading out the still image signal. Then, the read LV image signal is transferred to the DSP 108 and corrected by the image correction circuit included in the DSP 108. At this time, the still image signal read out between time t400 and time t401 are kept in the RAM 109 without being corrected. At time t403, the reading of the LV image signal is completed, and at the same time, the correction processing of the LV image signal in the image correction circuit is also completed. The live view image generated based on the LV image signal that has been corrected is displayed on the display unit 114.

Next, at time t404, the still image signal stored in the RAM 109 is read out and transferred to the image correction circuit, and the correction processing of the still image signal is started. This correction processing is completed at time t405. As described above, since the processing speed of the image correction circuit is slower than the reading speed of the still image signal, a period from time t404 to time t405 is longer than a period from time t400 to time t401.

At time t406, the timing pulse generation circuit 111 asserts a second synchronization signal, and in synchronization with this, the image sensor 107 starts reading out an LV image signal for the next frame. It should be noted that the reset scan of image sensor 107 is started at the time prior to time t406 by a predetermined exposure period so that the correction processing of the still image signal by the image correction circuit is completed before reading of the LV image signal is started at time t406. Then, the read LV image signal is transferred to the DSP 108 and corrected by the image correction circuit included in the DSP 108.

At the following time t408, the timing pulse generation circuit 111 asserts a second synchronization signal, and in synchronization with this, the image sensor 107 starts reading out a still image signal. The time t408 is determined based on the following conditions. That is, the time 408 should be after an exposure period (charge accumulation period) TST predetermined by photometry or user instruction since the start of reading out the LV image signal at time t406 allows reset scan for accumulating charge for still image generation. The read still image signal is transferred to the DSP 108 and sequentially stored in the RAM 109 connected to the DSP 108.

After time t409, the same control as the control during a period from time t402 to time t409 is repeated. By repeating the control during the period from time t402 to time t409, it is possible to continuously shoot still images while acquiring LV images at a moving image cycle. Further, the period from time t402 to time t406 is controlled to be equal to a period from time t406 to time t409.

In this way, in the first operation mode, it is possible to acquire LV images at a fixed cycle while shooting still images. Then, by sequentially displaying the LV images on the display unit 114, in a case where the reading speed of the still image signal is faster than the correction speed of the image correction circuit, it becomes possible to shoot and correct the LV images and then display the corrected LV images on the display unit 114 at a fixed cycle while shooting and correcting the still images.

Next, a shooting operation in the second operation mode will be described with reference to the timing chart of FIG. 5.

This operation is performed, for example, in response to a shooting instruction issued in response to the user pressing the still image shooting button provided in the operation unit 115. Note that the solid lines, dot-dash lines and the broken lines represent the same as those shown in FIG. 4, and the description thereof will be omitted. In the second operation mode, it is assumed that the time taken to read out the still image signal is substantially the same as the time taken to correct the still image signal by the image correction circuit built in the DSP 108.

At time t500, the timing pulse generation circuit 111 asserts a second synchronization signal, and in synchronization with this, the image sensor 107 starts reading out an LV image signal. It is assumed that the reset scan of the image sensor 107 is started at the time prior to time t500 by an exposure period (charge accumulation period) predetermined by photometry or user instruction. Then, at the same time as the reading of the LV image signal is started, the read LV image signal is transferred to the DSP 108 and corrected by the image correction circuit build in the DSP 108. At time t501, the reading of the LV image signal is completed, and the correction processing of the LV image signal by the image correction circuit is also completed.

At time t502, the timing pulse generation circuit 111 asserts a second synchronization signal, and in synchronization with this, the image sensor 107 starts reading out a still image signal. The time t502 is determined based on the following conditions. That is, the image correction circuit becomes free at time t501 and the start of reading out the LV image signal at time t500 allows reset scan for accumulating charge for still image generation. Therefore, the timing after time t501 when the exposure period (charge accumulation period) TST predetermined by photometry or user instruction has elapsed since the reset scan is performed at the timing after time t500 is time t502 when reading of a still image signal is started. FIG. 5 shows a case where the exposure period $T_{ST}$ is longer than the period from time t500 to time t501. At the same time as the reading of the still image signal is started, the read still image signal is transferred to the DSP 108, and the correction of the still image signal is started by the image correction circuit included in the DSP 108. At time t503, the reading of the still image signal is completed, and at the same time, the correction processing of the still image signal in the image correction circuit is also completed.

At the following time t404, the timing pulse generation circuit 111 asserts a second synchronization signal, and in synchronization with this, the image sensor 107 starts reading out an LV image signal. It should be noted that the reset scan of the image sensor 107 is started at the time prior to time t504 by an exposure period (charge accumulation period) predetermined by photometry or user instruction. The exposure period at this time is shorter than the time TLV in consideration of the timing of the end of reading out the still image signal By repeating the above control during the period from time t500 to time t504, it is possible to continuously shoot still images while acquiring LV images at a moving image cycle. Then, the period from time t500 to time t504 is set as a moving image cycle, and the control is continued so that the LV images can be shot at this cycle.

As described above, in the second operation mode, it is possible to acquire LV images at a fixed cycle while shooting still images. Then, by sequentially displaying the LV images on the display unit 114, in a case where the reading speed of the still image signal is the same or slower than the correction speed of the image correction circuit, it becomes possible to shoot and correct the LV images.

Even when the reading speed of the still image signal is equal to or less than the correction speed of the image correction circuit, the data may be stored in the RAM 109 as described with reference to FIG. 4, and the correction processing may be performed later; however, in that case, the band of the RAM 109 is consumed and as a result power consumption is increased. These disadvantages can be eliminated by performing the control shown in FIG. 5.

Further, in FIGS. 4 and 5, it has been described that charge accumulation is started by reset scanning the image sensor 107, however, the present invention is not limited to this. For example, after reset scanning of the image sensor 107, charge accumulation may be started by moving the front curtain of the focal plane shutter 105 to expose the image sensor 107.

If the shooting operation is performed in the first operation mode shown in FIG. 4, the correction of the still image and the correction of the LV image can be achieved at the same time even if the reading speed of the still image signal is high, but the band of the RAM 109 is consumed, which increases the power consumption of the RAM 109. On the other hand, if the shooting operation is performed in the second operation mode shown in FIG. 5, in a case where the reading speed of the still image signal is equal to or less than the processing speed of the image correction circuit, both the correction of the still image and the correction of the LV image correction can be achieved without consuming the band of the RAM 109 and without increasing the power consumption. Therefore, by switching the method to be used according to the reading speed of the still image, it is possible to take advantage of each operation method.

FIG. 6 is a flowchart illustrating a method of switching between the shooting operation in the first operation mode shown in FIG. 4 and the shooting operation in the second operation mode shown in FIG. 5.

When the still image shooting is set, the processing of FIG. 6 is started. In step S601, the user selects a still image shooting mode through the operation unit 115. The method for selecting the shooting mode may be explicit or implicit, and for example, the shutter operation method may be provided to the user as an option.

In step S602, it is determined whether the selected shooting mode is suitable for the shooting operation in the first operation mode or the shooting operation in the second operation mode. Here, it is determined whether or not the reading speed of the still image signal in the selected shooting mode is faster than the correction speed of the image correction circuit. If yes, the process proceeds to step S603, and if no, the process proceeds to step S604.

Instead of determining the speed in step S602, information associated with the shooting mode and the first operation mode or the second operation mode may be retained in advance and used for the determination. Further, as described above, if the shooting mode is implicitly selected by, for example, the shutter operation method, the following way of determination may be considered. That is, if a mechanical front curtain method that controls the exposure time using the focal plane shutter 105 is selected, it is judged that the second operation mode is suitable because it takes time to perform scanning for starting charge accumulation in the image sensor 107. On the other hand, when the electronic shutter is selected, it is possible to scan the image sensor 107 at high speed, so it is determined that the first operation mode is suitable.

In step S603, the program for the operation sequence in the first operation mode shown in FIG. 4 is loaded, and in step S604, the program for the operation sequence in the second operation mode shown in FIG. 5 is loaded, and the processing is terminated. After that, shooting is performed according to the loaded program.

In the flowchart shown in FIG. 6, the operation mode of the image sensor 107 is changed according to the user's operation in step S601, however, the method of changing the operation mode is not limited to this. For example, the shooting mode of the still image to be shot in the next frame may be determined according to various conditions calculated from the shot image, and the drive mode may be changed accordingly. In that case, the operation mode of the image sensor 107 can be switched according to the shooting conditions by performing the processes in step S602 and its subsequent steps as described above. Then, after the time when the switching of the operation mode is completed in step S603 or S604, the image sensor 107 can be operated by the switched operation sequence.

As described above, according to the first embodiment, the first operation mode and the second operation mode are selectively used. As a result, regardless of the relationship between the reading speed of the still image signal and the correction speed of the image correction circuit, it is possible to acquire LV images at a fixed cycle while taking still images.

Second Embodiment

Next, a second embodiment of the present invention will be described.

In the first embodiment described above, a method of switching the image shooting sequence according to the reading speed of the still image has been described. In the case of the first embodiment, only one image is obtained in one exposure operation for the still image signal. However, some image sensors can acquire a plurality of images by amplifying the image signal obtained in one exposure operation with different gains. Accordingly, in the second embodiment, the control of the shooting operation in the case of acquiring a plurality of images by amplifying an image signal obtained in one exposure operation with different gains will be described. In the second embodiment, in the image capturing apparatus 1 shown in FIG. 1, the configuration of the image sensor 107 is different from that shown in FIGS. 2A and 2B, and thus will be described below.

Figure 7A:
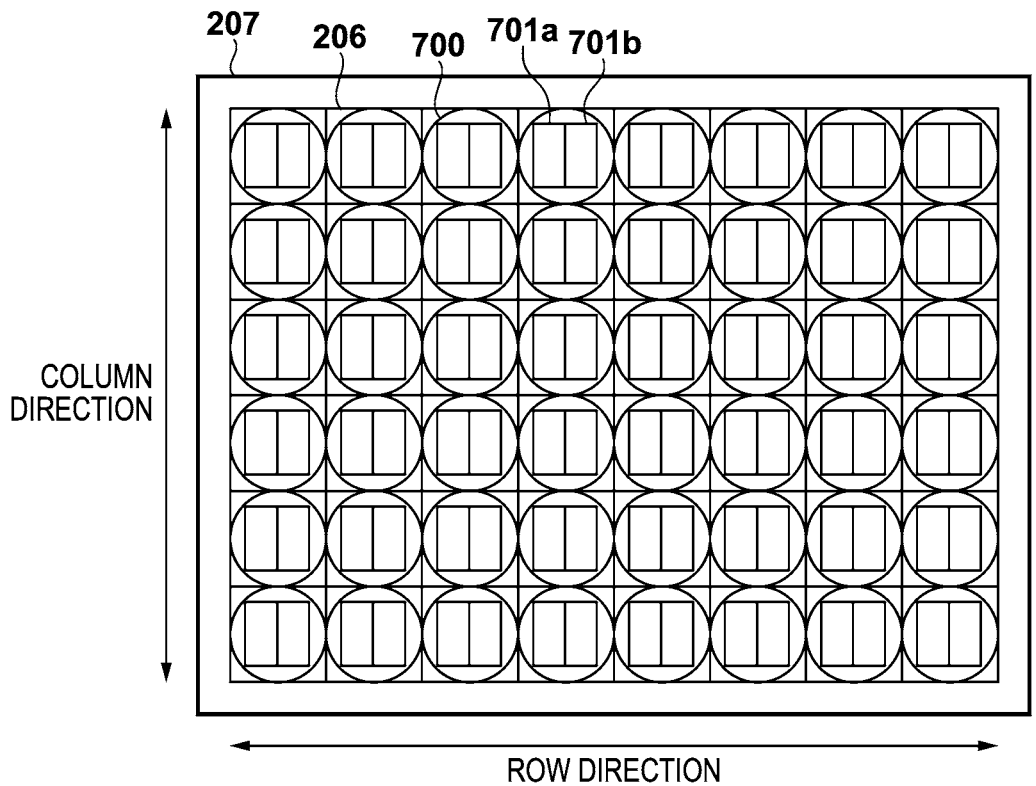
FIG. 7A is a top view showing a schematic configuration of an image sensor according to a second embodiment.
Figure 7B:
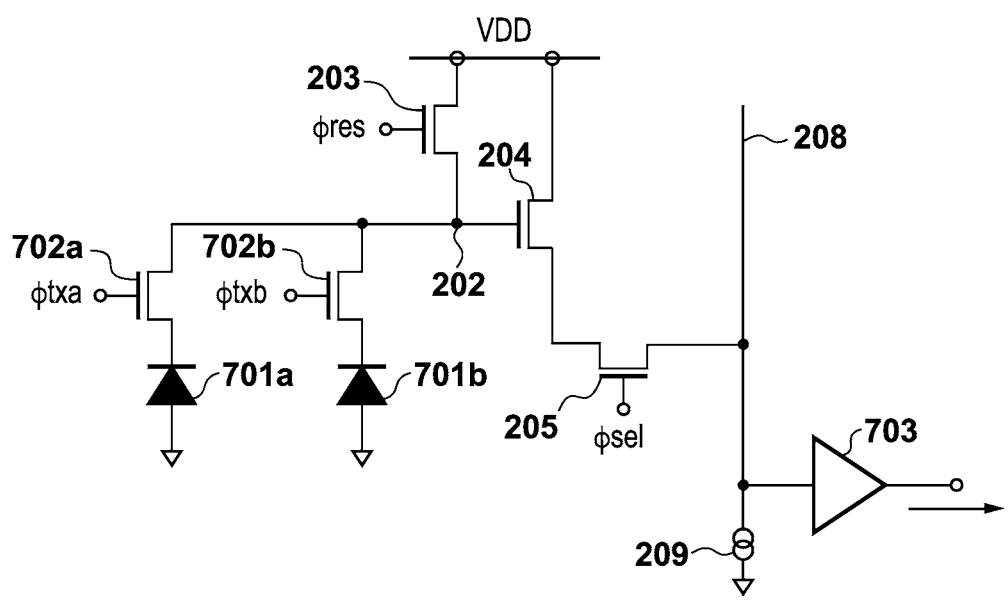
FIG. 7B is a circuit diagram of a pixel unit according to the second embodiment.

FIGS. 7A and 7B are diagrams showing the configuration of the image sensor 107 in the second embodiment. In FIGS. 7A and 7B, the same reference numerals are assigned to the same configurations as those in FIGS. 2A and 2B, and the description thereof will be omitted.

FIG. 7A is a schematic top view showing the pixel array 207 of the image sensor 107, in which the pixel units 206 are arranged in a matrix. Each pixel unit 206 includes one microlens 700, and two photoelectric conversion units (photodiode: PD) 701a and 701b are arranged under each microlens 700.

FIG. 7B shows a circuit diagram of one pixel unit 206. The PD 701a is connected to a transfer switch 702a controlled by a control signal φtxa, and the PD 701b is connected to a transfer switch 702b controlled by a control signal φtxb. By setting the control signal φtxa to High and turning on the transfer switch 702a, the electric charge accumulated in the PD 701a is transferred to the FD 202 via the transfer switch 702a. Further, by setting the control signal φtxb to High and turning on the transfer switch 702b, the electric charge accumulated in the PD 701b is transferred to the FD 202 via the transfer switch 702b. Therefore, by setting the control signals φtxa and φtxb to High at different timings, the electric charges of the PD 701a and PD 701b can be read out independently. Further, by setting the control signals φtxa and φtxb to High simultaneously, the electric charges of the PD 701a and PD 701b can be added and read out. An image signal obtained by adding the electric charges can be used as a still image for recording or as an LV image.

Further, in the configuration of FIG. 7B, the voltage of the vertical output line 208 changes according to the electric charge read out from each pixel unit 206, and the voltage is amplified by a column amplifier 703 and input to the AD conversion circuit. In this configuration, it is possible to perform AD conversion on the same pixel signal while changing the gain of the column amplifier 703. That is, since the electric charge obtained by one exposure operation of the image sensor 107 can be read out after being applied with different gains, it is possible to obtain a plurality of images having different brightness.

In this embodiment, a configuration is shown in which a plurality of pupil-divided images output from the PDs 701a and PDs 701b, respectively, and a plurality of images amplified with different gains can be obtained. However, the present invention is not limited to this, and any configuration may be used as long as a plurality of images can be obtained in one exposure operation.

Next, with reference to the timing chart of FIG. 8, a shooting operation in the third operation mode, in which signals are read out from PDs 701a and PDs 701b, respectively, of the pixel units 206 shown in FIGS. 7A and 7B will be described.

This process is initiated in the same manner as the process shown in FIG. 4, for example, in response to a shooting instruction issued by the user pressing the still image shooting button provided in the operation unit 115. Since the solid lines, the dot-dash lines, and the broken lines in the figure represent the same as those in FIG. 4, the description thereof will be omitted. In addition, it is assumed that the still image signal is read out at very high speed, and the time taken to correct the still image signal by the image correction circuit built in the DSP 108 is longer than the time taken to read out the still image signal.

At time t800, the second SSG 301 of the timing pulse generation circuit 111 asserts a second synchronization signal, and in synchronization with this, reading of an image signal (referred to as "A signal", hereinafter) from the PDs 701a of the image sensor 107 is started. It is assumed that the reset scan of the image sensor 107 is started at the time prior to time t800 by an exposure period (charge accumulation period) predetermined by photometry or user instruction. Then, at the same time as the reading of the A signal is started, the read A signal is transferred to the DSP 108 and stored in the RAM 109 connected to the DSP 108. When the reading of the A signal is completed at time t801, the storage of the A signal in the RAM 109 is also completed.

At time t802, the timing pulse generation circuit 111 asserts a second synchronization signal, and in synchronization with this, reading of an image signal (referred to as "B signal", hereinafter) from the PDs 701b of the image sensor 107 is started. Then, at the same time as the reading of the B signal is started, the read B signal is transferred to the DSP 108 and stored in the RAM 109 connected to the DSP 108. When the reading of the B signal is completed at time t803, the storage of the B signal in the RAM 109 is also completed.

At time t804, the timing pulse generation circuit 111 asserts a second synchronization signal, and in synchronization with this, the image sensor 107 starts reading out an LV image signal. It should be noted that the reset scan of the image sensor 107 is started at the time prior to time t804 by an exposure period (charge accumulation period) predetermined by photometry or user instruction. The exposure period at this time is shorter than the time TLV in consideration of the timing of the end of reading out the B signal. Then, the read LV image signal is transferred to the DSP 108 and corrected by the image correction circuit included in the DSP 108. At this time, data of the A signal and B signal read out between time t800 and time t803 are kept in the RAM 109 without being corrected. At time t805, the reading of the LV image signal is completed, and at the same time, the correction processing in the image correction circuit is also completed. The live view image generated based on the LV image signal that has been corrected is displayed on the display unit 114.

Next, at time t806, the image signal stored in the RAM 109 is read out and transferred to the image correction circuit, and the correction processing of the A signal is started. This correction processing is completed at time t807. As described above, since the processing speed of the image correction circuit is slower than the reading speed of the A signal, a period from time t806 to time t807 is longer than a period from time t800 to time t801.

When the correction processing of the A signal is completed, next, at time t808, the B signal stored in the RAM 109 is read out and transferred to the image correction circuit, and the correction processing of the B signal is started. This correction processing is completed at time t809. By transferring the image signal in this way, it is unnecessary to interrupt/restart the processing of the image correction circuit, and the control becomes simple.

Similarly, when reading out image signals from the image sensor 107 by applying two different gains to one image signal, the two image signals obtained by applying the two gains are read out and stored in the RAM 109, then correction processing may be performed sequentially.

At time t810, the timing pulse generation circuit 111 asserts a second synchronization signal, and in synchronization with this, the image sensor 107 starts reading out an LV image signal. It should be noted that the reset scan of the image sensor 107 is started at the time prior to time t810 by a predetermined exposure period so that the correction processing of the B signal by the image correction circuit is completed before reading of the LV image signal is started. Then, the read LV image signal is transferred to the DSP 108 and corrected by the image correction circuit included in the DSP 108.

At the following time t811, the timing pulse generation circuit 111 asserts a second synchronization signal, and in synchronization with this, reading of an A signal from the PDs 701a of the image sensor 107 is started. The time t811 is determined based on the following conditions. That is, the time t811 should be after an exposure period (charge accumulation period) $T_{ST}$ predetermined by photometry or user instruction since the start of reading out the LV image signal at time t810 allows reset scan for accumulating charge for still image generation. The read A signal is transferred to the DSP 108 and sequentially stored in the RAM 109 connected to the DSP 108.

At the following time t812, the timing pulse generation circuit 111 asserts a second synchronization signal, and in synchronization with this, the image sensor 107 starts reading out a B signal. The read B signal is transferred to the DSP 108 and sequentially stored in the RAM 109 connected to the DSP 108.

Then, at time t813, the timing pulse generation circuit 111 asserts a second synchronization signal, and in synchronization with this, the image sensor 107 starts reading out an LV image signal for the next frame.

After that, the processes from time t804 to time 813 are repeated.

In the above example, the case of reading out an A signal and a B signal has been described, however, it may be controlled such that an A signal and an A+B signal obtained by adding the charges of the PD 701a and PD 701b by simultaneously turning on the transfer switches 702a and 702b are read out.

Next, a shooting operation in a fourth operation mode will be described with reference to the timing chart of FIG. 9. Note that the solid lines, dot-dash lines and the broken lines represent the same as those shown in FIG. 4, and the description thereof will be omitted. In addition, it is assumed that the still image signal is read out at a very high speed, and the time taken to correct the still image signal by the image correction circuit built in the DSP 108 is longer than the time taken to read out the still image signal. Further, it is assumed that an A signal and a B signal are independently read out. In addition, since the operation from time t800 to time t807 is the same as the operation from time t800 to time t807 shown in the timing chart of FIG. 8, the description thereof will be omitted.

After the correction processing of the A signal is completed at time 807, at time t901, the timing pulse generation circuit 111 asserts a second synchronization signal, and in synchronization with this, the image sensor 107 starts reading out an LV image signal. It is assumed that the reset scan of the image sensor 107 is started at the time prior to time t901 by a predetermined exposure period and such that the correction processing of the A signal by the image correction circuit is completed at the time of starting the reading of the LV image signal at time t901. Then, the read LV image signal is transferred to the DSP 108 and corrected by the image correction circuit build in the DSP 108.

When the correction processing of the LV image signal is completed at time t902, then, at time t903, the B signal stored in the RAM 109 is read out and transferred to the image correction circuit, and the correction processing of the B signal is started. This correction processing is completed at time t904. With this correction processing, all the correction processing of the read still image data is completed.

At time t905, the timing pulse generation circuit 111 asserts a second synchronization signal and the same operation as that started at time t804 is performed.

At the following time t906, the timing pulse generation circuit 111 asserts a second synchronization signal, and in synchronization with this, reading of an A signal from the PDs 701a of the image sensor 107 is started. The time t906 is determined based on the following conditions. That is, time t906 should be after the exposure period (charge accumulation period) $T_{ST}$ predetermined by photometry or user instruction after the time at which the start of reading out the LV image signal at time t905 allows reset scan for accumulating charge for a still image generation. The read A signal is transferred to the DSP 108 and sequentially stored in the RAM 109 connected to the DSP 108.

After time t907, the operation from time t804 to time t907 is repeated.

By controlling in this way, the period from time t804 to time t901, the period from time t901 to time t905, and the period from time t905 to time t907 can be made equal. This makes it possible to shoot LV images for display on the display unit 114 at regular intervals while shooting still images.

Figure 8:
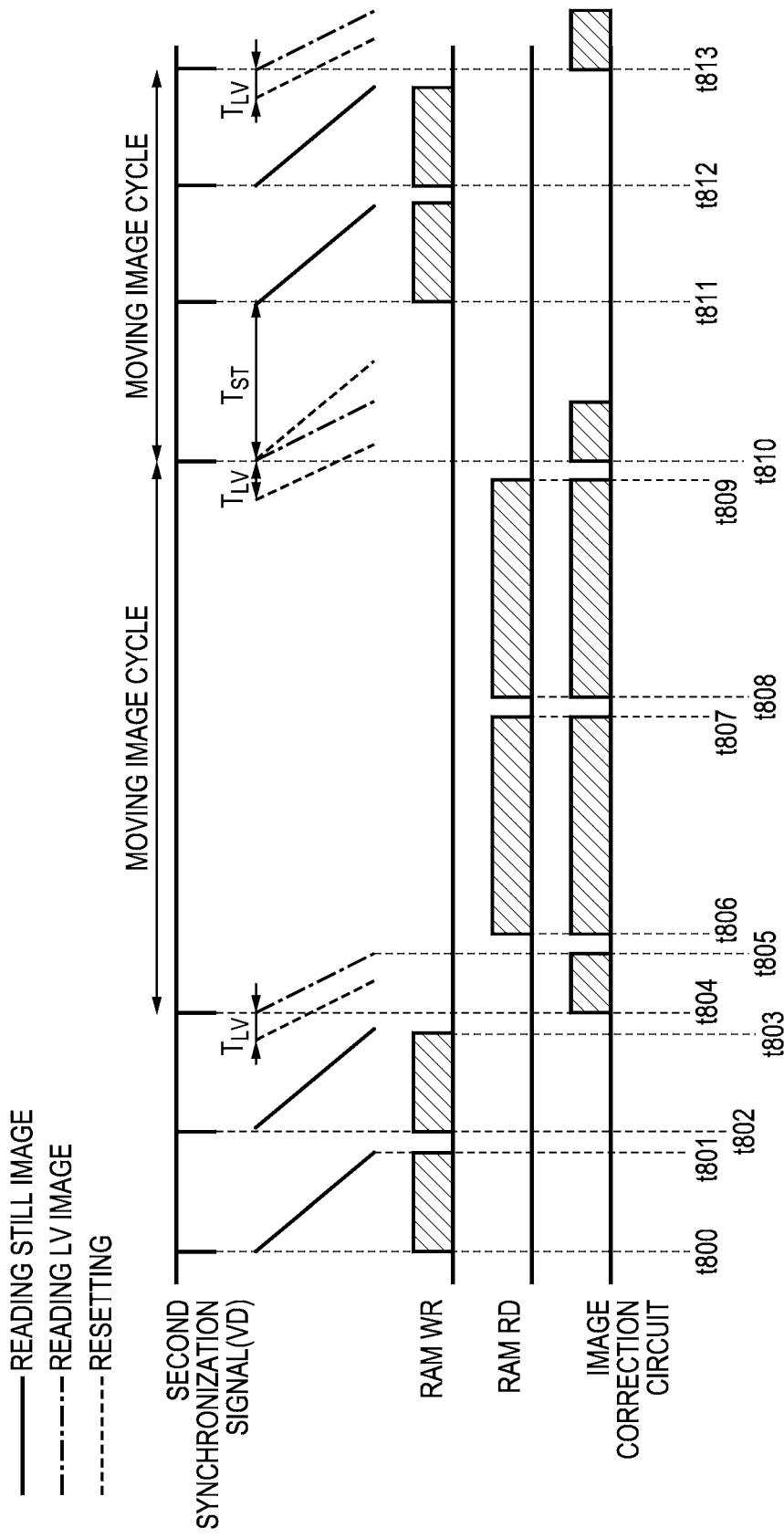
FIG. 8 is a timing chart according to a third operation mode in the second embodiment.
Figure 9:
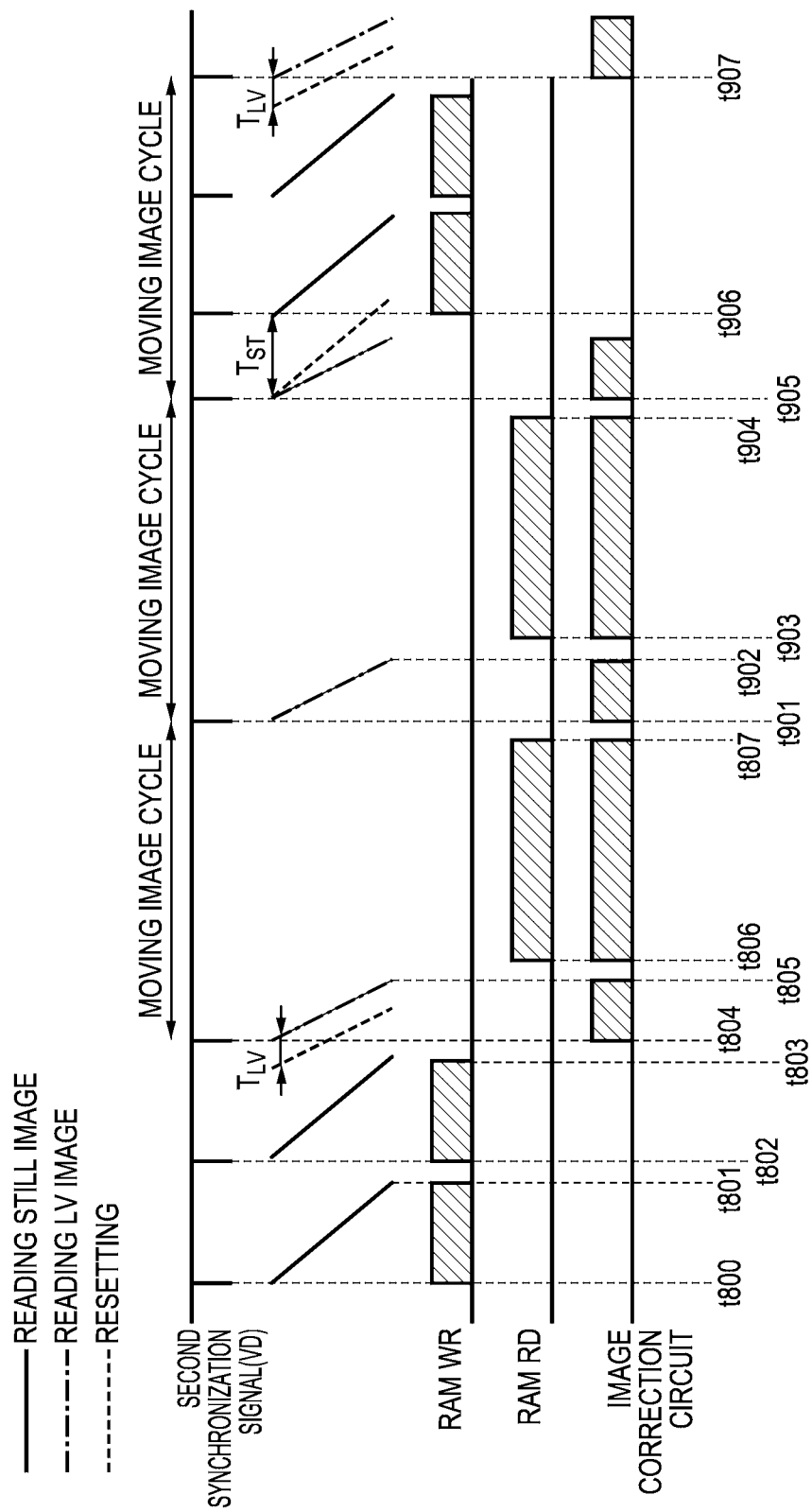
FIG. 9 is a timing chart according to a fourth operation mode in the second embodiment.

However, in the fourth operation mode shown in FIG. 9, the shooting interval of the still images is from time t800 to time t906, which is longer than the period from time t800 to time t811, which is the shooting interval of the still images in the timing chart of FIG. 8. This is because the LV image is shot during the correction processing of the plurality of still images.

On the other hand, in the third operation mode shown in FIG. 8, the shooting interval of the still images is shorter than that of the fourth operation mode, but the interval from time t804 to time t810 and the interval from time t810 to time t813 are different.

As described above, when the shooting operation is performed in the third operation mode shown in FIG. 8, the shooting frame rate of the still images can be improved as compared with the shooting operation in the fourth shooting mode shown in FIG. 9. On the other hand, when the shooting operation is performed in the fourth operation mode, it is possible to shoot LV images at regular intervals while shooting still images. Therefore, by switching the shooting modes according to which of the still images and the displayed image is prioritized, it is possible to take advantage of each operation method.

Figure 10:
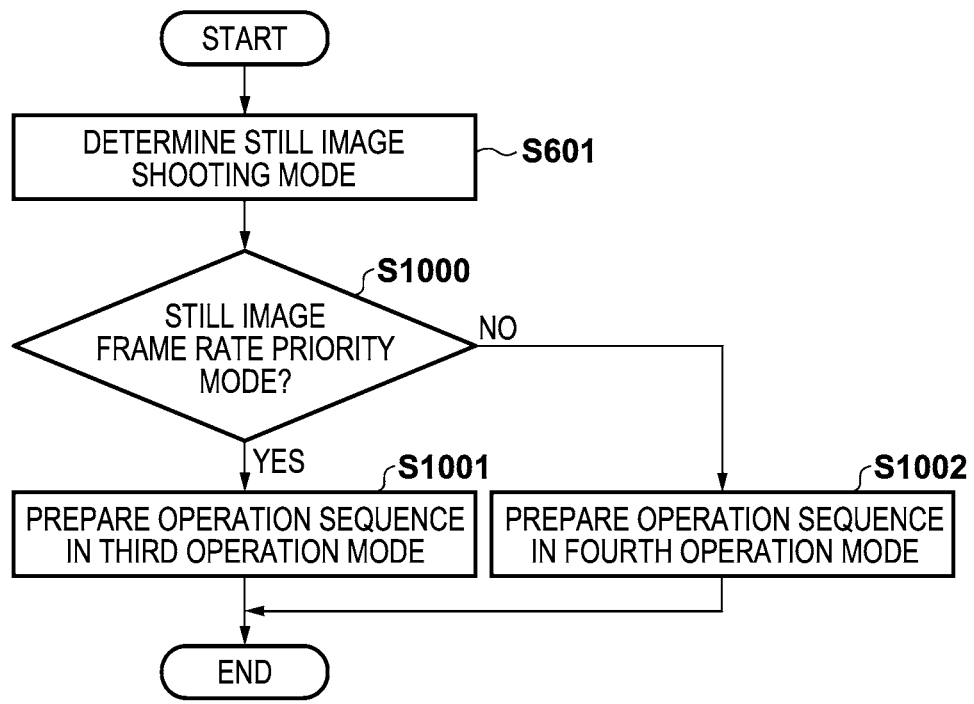
FIG. 10 is a flowchart showing a control for switching a shooting mode in the second embodiment.

FIG. 10 is a flowchart illustrating a method of switching between the shooting operation in the third operation mode shown in FIG. 8 and the shooting operation in the fourth operation mode shown in FIG. 9. The steps in which the same processes are performed as those in the flowchart of FIG. 6 are assigned the same step numbers, and the description thereof will be omitted.

In step S1000, it is determined whether or not the determined still image shooting mode is a still image frame rate priority mode, and if it is the still image frame rate priority mode, the process proceeds to step S1001, otherwise the process proceeds to step S1002. In a case where the process proceeds to step S1001, the program for the operation sequence in the third operation mode shown in FIG. 8 is loaded, and in a case there the process proceeds to step S1002, the program for the operation sequence in the fourth operation mode shown in FIG. 9 is loaded, and the process is terminated. After that, shooting is performed according to the loaded program.

As described above, according to the second embodiment, for an image sensor capable of reading out a plurality of images by amplifying a still image signal obtained in one exposure operation with different gains, a plurality of shooting sequences are prepared and switched according to the shooting mode of the still images. This makes it possible to provide the user with an option to prioritize the frame rate of the still image or the display quality in the viewfinder, whichever is preferable.

Third Embodiment

Next, a third embodiment of the present invention will be described.

In the third embodiment, a shooting operation in a case where it is desired to shorten the continuous shooting interval of still images as compared with the first and second embodiments will be described.

Figure 11:
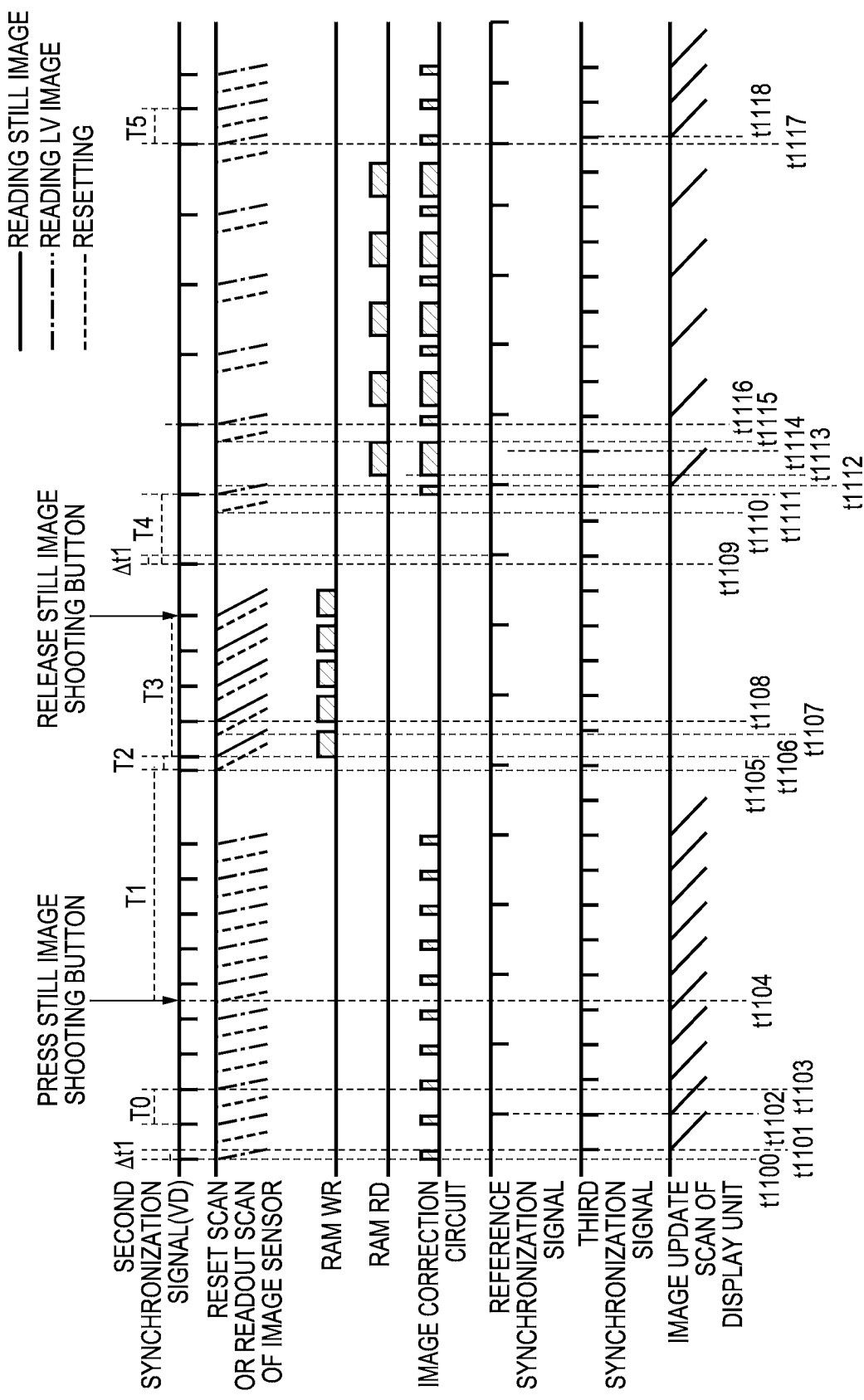
FIG. 11 is a timing chart according to a fifth operation mode in the third embodiment.

FIG. 11 is a timing chart showing a shooting operation in a fifth operation mode according to the third embodiment. Note that the process shown in FIG. 11 is initiated in the same manner as the process shown in FIG. 4, for example, in response to a shooting instruction issued by the user pressing the still image shooting button provided in the operation unit 115. Since the solid lines, the dot-dash lines, and the broken lines in the figure represent the same as those in FIG. 4, the description thereof will be omitted. However, in the figure, the diagonal solid line of the "image update scan of display unit" indicates the scan that the display unit 114 updates the image. In addition, it is assumed that a still image signal is read out at high speed, and the time taken to correct the still image signal by the image correction circuit built in the DSP 108 is longer than the time taken to read out the still image signal.

When a second synchronization signal is asserted from the second SSG 301 of the timing pulse generation circuit 111 at time t1100, in synchronization with this, reading of an LV image signal is started. At the same time, the image correction circuit included in the DSP 108 starts correction processing for the read LV image signal. When a third synchronization signal is asserted from the third SSG 302 of the timing pulse generation circuit 111 at time t1101, the LV image generated based on the LV image signal corrected at time t1100 is displayed in the display unit 114. By repeating this series of operations with a period T0 as a cycle, the LV display is updated at regular intervals. Here, it is assumed that the shot image can be stably displayed by providing the phase difference Δt1 from the shooting of the image to the display of the image by the time difference between time t1100 and time t1101.

At time t1102, a reference synchronization signal is asserted from the reference SSG 300 of the timing pulse generation circuit 111. The third SSG 302 resets the value of an internal counter when it receives the reference synchronization signal. In this way, the third SSG 302 is synchronized with the synchronization signal from the reference SSG 300. The reference synchronization signal is also input to the CPU 110, and when the CPU 110 detects that the reference synchronization signal is asserted, it reads a value from a counter representing the system time of the CPU 110 and records the count value.

At time t1103, a second synchronization signal is asserted from the second SSG 301, and the reading of an LV image signal is started. At the same time, the second synchronization signal is input to the CPU 110, and the CPU 110 records a count value representing the system time at which this second synchronization signal is asserted. The CPU 110 calculates an assertion timing of a second synchronization signal by calculation from the count values of the reference synchronization signal and the second synchronization signal. Then, based on the calculation result, the timing pulse generation circuit 111 is controlled to synchronize the second synchronization signal with the reference synchronization signal with a certain time difference. By controlling in this way, since both the second synchronization signal and the third synchronization signal can be synchronized with the reference synchronization signal, the phase difference Δt1 between the second synchronization signal and the third synchronization signal can be kept constant.

When the still image shooting button is pressed at time t1104, the reset scan for the still image is started at time t1105 when the release time lag T1 has elapsed since time t1104. Subsequently, at the time t1106 when a charge accumulation period T2 has elapsed, the reading of the still image signal is started and the read still image signal is temporarily stored in the RAM 109. Then, at time t1107, the reset scan for the still image is started again, and at time t1108, the reading of the corresponding still image signal is started, and similarly, the read still image signal is temporarily stored in the RAM 109. This operation is repeated for the period T3 until the still image shooting button is released. Although this period T3 is a period during which the still image shooting button is pressed in the present embodiment, the period T3 is not limited to this. For example, the user may set the number of shots and the shooting interval using an UI of the operation unit 115 in advance, and the period for repeating the shooting operation with the accumulation period T2 may be calculated from the set number of shots and the shooting interval.

After the lapse of the period T3, the CPU 110 controls the timing pulse generation circuit 111 so that a second synchronization signal is asserted with a phase difference Δt1 from the reference synchronization signal based on the counter of the reference synchronization signal. After the second synchronization signal is asserted at time t1109, reset scan for an LV image is started at time t1110. At time t1111, the reading of the corresponding LV image signal is started, and the DSP 108 performs image processing on the LV image signal. Then, when a third synchronization signal is asserted at time t1112, the display unit 114 starts displaying the LV image generated from the LV image signal whose reading is started at the time t1111.

Subsequently, at time t1113, in response to the completion of reading out the immediately preceding LV image signal, the still image signal read out in the period T3 and temporarily stored in the RAM 109 is read out, and the correction process is performed on the still image signal by the DSP 108. Therefore, the LV image signal for updating the display unit 114 corresponding to a third synchronization signal issued at time t1114 is not read out. The correction processing performed on the still image data refers to a correction process performed on the RAW data of the image sensor 107 such as a process of correcting variations for each individual sensor and a process of applying a digital gain. Incidentally, the development processing and the JPEG compression processing may be performed together with the correction processing during the period from time t1113 to time t1115, or may be performed at a timing after time t1115.

Then, at time t1115, reset scan for an LV image is started, and at time t1116, the reading of the corresponding LV image signal is started, and the correction processing for the read LV image signal is started by the DSP 108. The period T4 from time t1109 to time t1111 is longer than the period T0, since image processing is performed on the still image data at time t1112. In the present embodiment, image processing is performed on only one still image data by the DPS 108 in each period T4, but the present invention is not limited to this, and a plurality of still image data may be continuously processed. In that case, a period in which the LV image signal for updating the display unit 114 corresponding to the third synchronization signal is not read out such as at time t1114 continues. Further, the timing pulse generation circuit 111 is controlled such that, even when the period T4 is lengthened, a second synchronization signal always synchronizes with a third synchronization signal with the phase difference $\Delta t1$.

Then, when the processing of all the still image signals temporarily stored in the RAM 109 is completed in the period T3 and the reading of the LV image signal is started at the time t1117, at time t1118, in synchronization with a third synchronization signal, the display unit 114 starts displaying an LV image generated from an LV image signal whose reading is started at time t1117. After this time, the reading of an LV image signal is repeated at the cycle of the period T5.

In FIG. 11, the period T5 has the same length as the period T0, but the present invention is not limited to this. Further, it has been explained that the timing for switching from the cycle of the period T4 to the cycle of the period T5 is when the processing of all the still image signals temporarily stored in the RAM 109 is completed, but the present invention is not limited to this, and the timing may be determined based on the display format of the display unit 114. For example, if the display format of the display unit 114 is an interlaced format, one image is created from the TOP field and the BOTTOM field. Therefore, when a third synchronization signal is asserted, the CPU 110 records the system time and also records the field information indicating the TOP field or the BOTTOM field. As a result, the cycle may be switched by determining the field information and whether or not the RAM 109 has a still image signal at the switching timing of the cycle.

Figure 12:
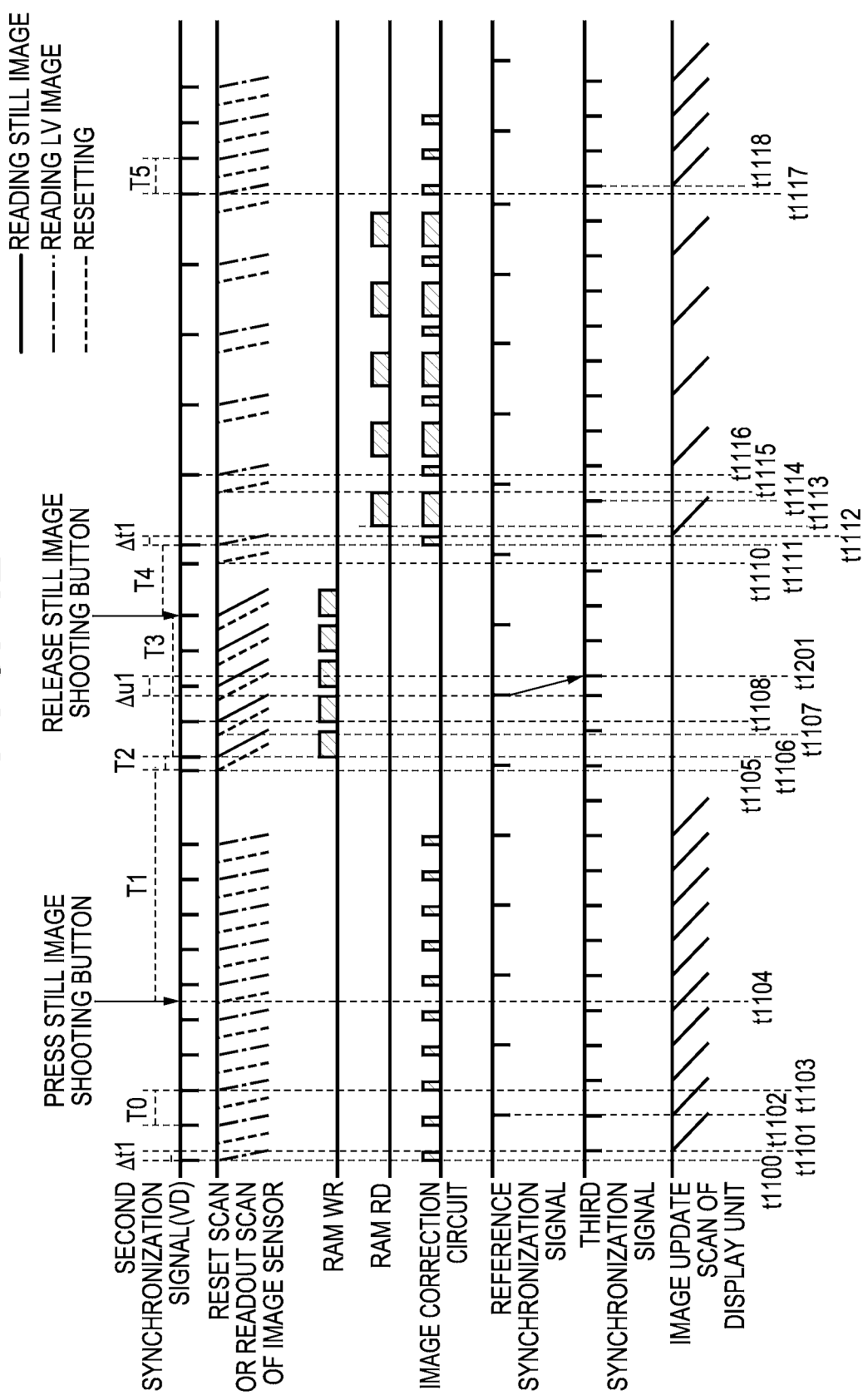
FIG. 12 is another timing chart according to the fifth operation mode in the third embodiment.

In the third embodiment, the timing pulse generation circuit 111 is controlled so that the second synchronization signals are asserted with the phase difference $\Delta t1$ with respect to the reference synchronization signals, however, the present invention is not limited to this. For example, as shown in FIG. 12, by setting the timing pulse generation circuit 111 so that the assertion timings of the third synchronization signals are shifted by $\Delta u1$ so that the second synchronization signals and the third synchronization signals are asserted with the phase difference $\Delta t1$, it is possible to forward the timing of reading out the LV image signals. With regard to $\Delta u1$, the periods T1, T2, and T4 are determined at time t1104 when the still image shooting button is pressed, and at the timing at which the still image shooting ends and the period T3 is determined, $\Delta u1$ can be calculated. That is, $\Delta u1$ is calculated so that the third synchronization signal is asserted at time t1112 in FIG. 12, and set to the timing pulse generation circuit 111. By asserting a third synchronization signal at time t1201 based on this setting, it is possible to forward the display timing of the LV image after the still images are shot. If it is set such that the number of shots preset by the user as described above are performed in the period T3, $\Delta u1$ can be determined at the time t1104. Further, it is assumed that the timing for calculating $\Delta u1$ and the timing for setting the timing pulse generation circuit 111 are before time t1111.

By performing the shooting operation in the fifth operation mode shown in FIG. 11 or FIG. 12, it is possible to realize higher-speed continuous shooting of still images. This makes it possible to provide ultra-high-speed continuous shooting of still images to users, such as professional users, who want to shoot an image at a decisive moment.

Figure 13:
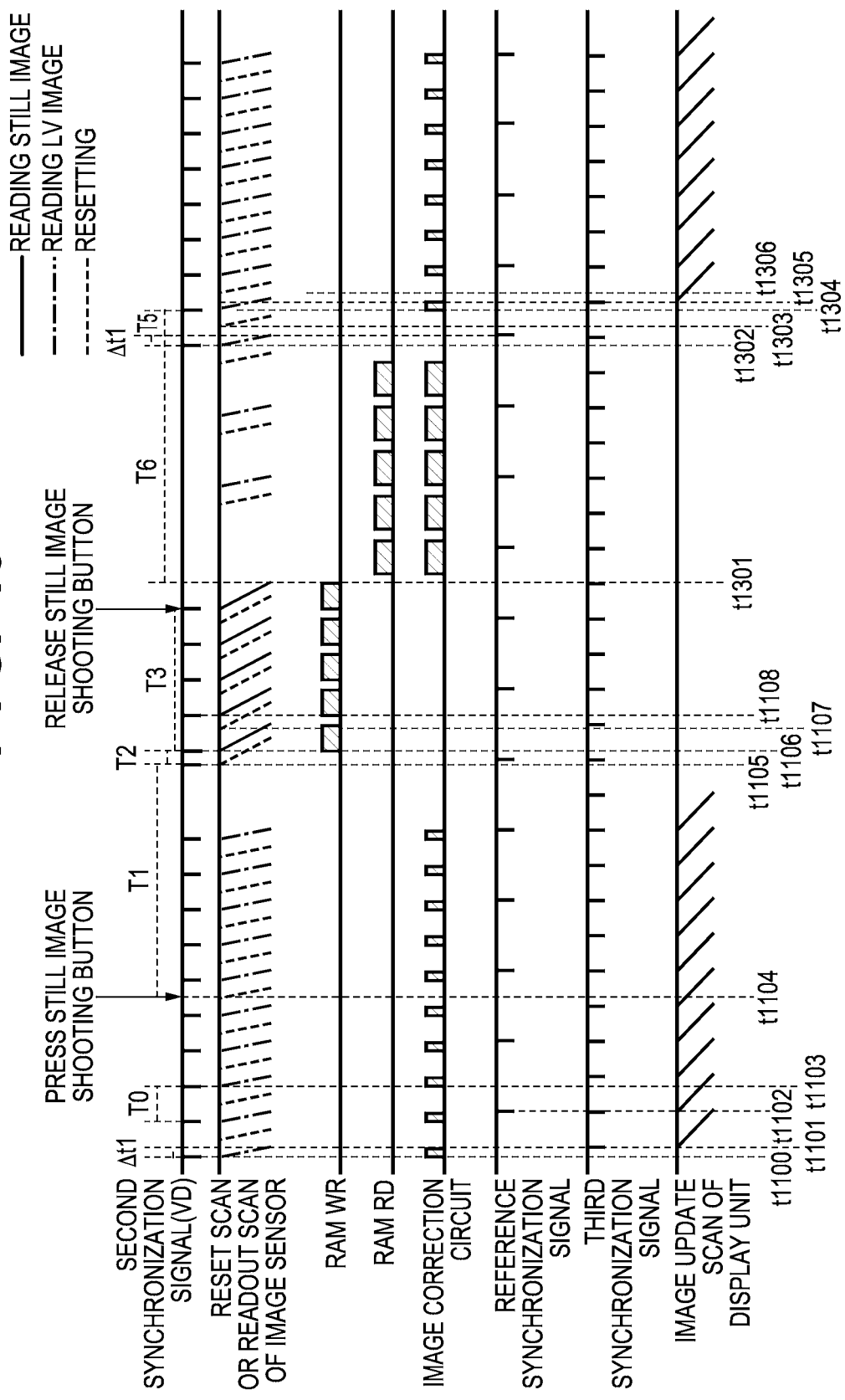
FIG. 13 is a timing chart according to a sixth operation mode in the third embodiment.

Next, the shooting operation in a sixth operation mode will be described with reference to the timing chart of FIG. 13. In FIG. 13, the same reference numerals are assigned to signals and timings as those in FIGS. 11 and 12, and the description thereof will be omitted as appropriate.

In the sixth operation mode, when the CPU 110 detects the completion of reading out the last still image signal at time t1301 after the lapse of the period T3, image signals for a plurality of still images temporarily stored in the RAM 109 are read out and corrected by the DSP 108.

It should be noted that, in the period T6 after time t1301, correction processing may be performed on the image signals for the plurality of still images temporarily stored in the RAM 109 and the DSP 108 may perform processing such as HDR processing and filtering processing by using the data of the plurality of still images.

Here, HDR processing is explained as an example, for example, an appropriately exposed image in which an accumulation time is controlled so that a main subject is exposed appropriately, an underexposed image in which an accumulation time is controlled so that a high-brightness subject such as a blue sky is exposed appropriately, and an overexposed image in which an accumulation time is controlled so that a low-brightness subject that is likely to be blocked up shadows is exposed appropriately are sequentially shot during the period T3. Then, the obtained image data of the three types of exposures are combined so that the high-brightness part is imported from the underexposed image and the low-brightness part is imported from the overexposed image, thereby generating an image expressing from low-brightness to high-brightness by DSP 108 in the period T6.

Subsequently, after the lapse of the period T6, the CPU 110 controls the timing pulse generation circuit 111 so that a second synchronization signal is asserted after the phase difference $\Delta t1$ with respect to the reference synchronization signal based on the counter of the reference synchronization signal, and the second synchronization signal is asserted at time t1302. Then, reset scan for an LV image is started at time t1303, and at time t1304, reading of the corresponding LV image signal is started and the DSP 108 performs correction processing on the LV image signal. Then, when a third synchronization signal is asserted at time t1305, the display unit 114 starts displaying an LV image generated from the LV image signal whose reading is started at time t1304. After this time t1304, the reading of an LV image signal is repeated at the cycle of the period T5.

It should be noted that the processing such as HDR processing and filter processing does not necessarily have to be performed during the period T6, and may be performed in parallel during the reading cycle of an LV image signal after the end of the period T6.

Further, in the present embodiment, the timing pulse generation circuit 111 is controlled so that the second synchronization signal is asserted with the phase difference Δt1 with respect to the reference synchronization signal, however, by setting the timing pulse generation circuit 111 so that the assertion timings of the third synchronization signals are shifted by Δu1 so that the second synchronization signals and the third synchronization signals are asserted with the phase difference Δt1, it is possible to forward time t1304. As described with reference to FIG. 12, Δu1 can be calculated from the lengths of the periods T1, T2, T3, T6, and T5. That is, Δu1 is calculated so that the third synchronization signal is asserted at time t1305, and set to the timing pulse generation circuit 111. By asserting the third synchronization signals based on this setting, it is possible to forward the display timing of the LV image after the still images are shot.

By performing the shooting operation in the sixth operation mode shown in FIG. 13, it is possible to first execute image processing on captured still image signals and then read out an LV image signal. As a result, even in a case of performing complicated image composition processing such as HDR (high dynamic range) processing or filtering processing for applying special effects to an image, it becomes possible to perform the next shooting earlier.

Figure 14:
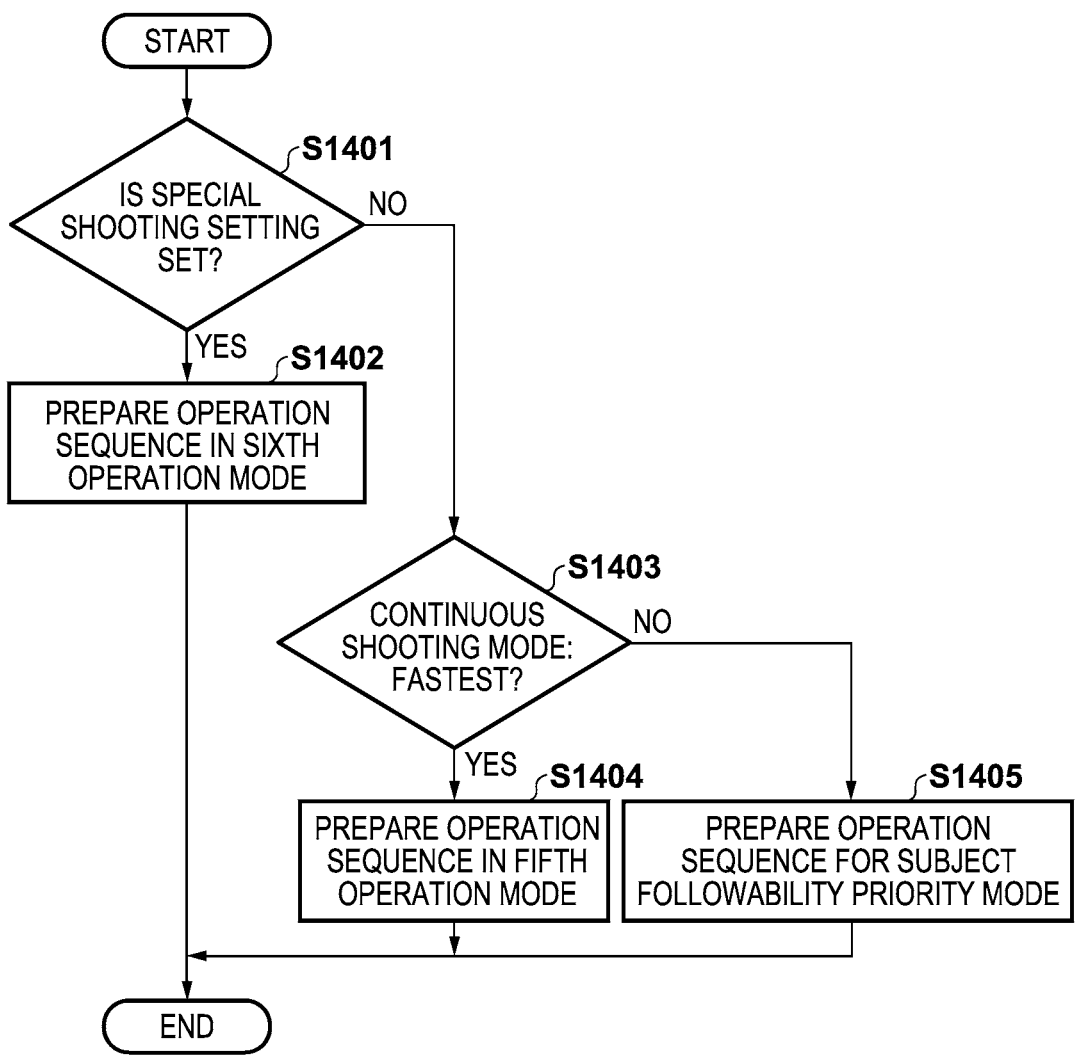
FIG. 14 is a flowchart showing a control for switching a shooting mode in the third embodiment.

Next, an example of switching the operation mode will be described with reference to the flowchart of FIG. 14. Unless otherwise specified, the processing of each step in the flowchart of FIG. 14 is realized by the CPU 110 controlling each part of the image capturing apparatus 1 shown in FIG. 1. The CPU 110 executes the processing of this flowchart at the timing when the still image shooting button is pressed.

In step S1401, the CPU 110 confirms the image processing method for the still image among the menu settings set by the user via the operation unit 115. For example, whether HDR processing is enabled, filtering processing that applies special effects to images is enabled, NR processing using multiple images is enabled, multiple exposure settings are enabled, and so on are checked. Here, if a menu for executing image processing for shooting and synthesizing a plurality of still images and generating one image is set, the process proceeds to step S1402, and in other cases, the process proceeds to step S1403.

In step S1402, a shooting sequence for special shooting is executed. Here, the program for the operation sequence in the sixth operation mode shown in FIG. 13 is loaded.

Next, in step S1403, among the menu settings set by the user via the operation unit 115, the continuous shooting mode is confirmed. For example, regarding the continuous shooting mode, if there are five speed choices of Fastest, High+, High, Low, and Single, it is determined whether the "Fastest" is set, and if the "Fastest" is set, the process proceeds to step S1404. If a continuous shooting mode other than the "Fastest" is set, the process proceeds to step S1405.

In step S1404, a shooting sequence in which the frame rate is prioritized is executed. Here, the program of the operation sequence in the fifth operation mode shown in FIG. 11 or FIG. 12 is loaded.

On the other hand, in step S1405, a shooting sequence in which subject followability is prioritized is executed. Here, for example, the program of the sequence in any of the first to fourth operation modes shown in FIGS. 4, 5, 8, and 9 described in the first and second embodiments is loaded, and the process is terminated. As a method for selecting one of the first to fourth operation modes, the method described in the first or second embodiment with reference to FIG. 6 or FIG. 10 may be used. After that, shooting is performed according to the loaded program.

As described above, according to the third embodiment, since the shooting sequence is switched according to the content set by the user, it is possible to shoot an image with the optimum shooting sequence according to the user's setting.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-030627, filed Feb. 26, 2021 which is hereby incorporated by reference herein in its entirety.

What is claimed is:

1. An image capturing apparatus comprising at least one processor and/or circuitry which functions as:
   an actuator that actuates an image sensor;
   a storage that stores an image signal read out from the image sensor;
   an image processor that processes the image signal read out from the image sensor; and
   a controller that controls the actuator, the storage and the image processor by selectively using a plurality of operation modes,
   wherein the plurality of operation modes includes a first operation mode of performing, a first operation in which a first image signal is read out from the image sensor by the actuator and, without being stored in the storage, processed by the image processor, and performing a second operation in which a second image signal is read out from the image sensor by the actuator and stored in the storage before the first operation is performed and the stored second image signal is read out from the storage and processed by the image processor after the first operation is performed.

2. The image capturing apparatus according to claim 1, wherein the plurality of operation modes includes a second operation mode of performing the first operation and a third operation in which the second image signal is read out from the image sensor by the actuator at a timing different from the first operation and, without being stored in the storage, processed by the image processor.

3. The image capturing apparatus according to claim 2, wherein the controller
selects the first operation mode in a case where reading speed of the second image signal is faster than processing speed of the image processor, and
selects the second operation mode in a case where the reading speed of the second image signal is equal to or slower than the processing speed of the image processor.

4. The image capturing apparatus according to claim 1, in the second operation in the first operation mode, the second image signal is obtained by reading out a signal corresponding to a single exposure operation once or a plurality of times from the image sensor by the actuator and stored in the storage.

5. The image capturing apparatus according to claim 4, wherein the plurality of operation modes includes a third operation mode of performing the first operation and a fourth operation in which the second image signal corresponding to a single exposure operation is read out a plurality of times from the image sensor and stored in the storage before the first operation is performed once and the stored second image signal is read out from the storage by an amount corresponding to each of the plurality of readouts and processed by the image processor after each time the first operation is performed.

6. The image capturing apparatus according to claim 5, wherein the controller
selects the first operation mode in a case where reading of the second image signal is prioritized, and
selects the third operation mode in a case where reading of the first image signal is prioritized.

7. The image capturing apparatus according to claim 4, wherein the image sensor includes a plurality of pixels each having a plurality of photoelectric conversion units, and
wherein the actuator selectively performs a plurality of readout operations for reading out image signals from the plurality of photoelectric conversion units or a readout operation of adding the image signals of the plurality of photoelectric conversion units and reading out the added image signal.

8. The image capturing apparatus according to claim 4, wherein the image sensor has an amplifier capable of applying different gains, and
wherein the actuator controls to apply the different gains to the image signal read out the plurality of times by the amplifier and generate a plurality of image signals.

9. The image capturing apparatus according to claim 1, wherein in the first operation mode, in a case where an instruction to successively read out the second image signal a plurality of times is issued during the first operation is repeatedly performed the first operation is suspended and the second image signal is read out a plurality of times and stored in the storage, and then, the stored second signal is read out from the storage by an amount corresponding to each of the plurality of readouts and processed by the image processor after each time the first operation is performed.

10. The image capturing apparatus according to claim 9, wherein the plurality of operation modes includes a sixth operation mode of, in a case where an instruction to successively read out the second image signal a plurality of times is issued during the first operation is repeatedly performed, suspending the first operation and performing the fifth operation in which the second image signal is read out a plurality of times and stored in the storage, and then, the stored second signal is processed by the image processor before the first operation is resumed.

11. The image capturing apparatus according to claim 10, wherein the controller
selects the first operation mode in a case where a synthesis operation of synthesizing the plurality of second image signals is not performed, and
selects the fourth operation mode in a case where the synthesis operation is performed.

12. The image capturing apparatus according to claim 1, wherein it takes longer time to read out the second image signal then to read out the first image signal.

13. The image capturing apparatus according to claim 1, wherein the first image signal is a signal of each frame of a moving image, and the second image signal is a signal of a still image.

14. A control method of an image capturing apparatus comprising at least one processor and/or circuitry which functions as an actuator that actuates an image sensor, a storage that stores an image signal read out from the image sensor, an image processor that processes the image signal read out from the image sensor, the method comprising
controlling the actuator, the storage and the image processor by selectively using a plurality of operation modes,
wherein in a first operation mode included in the plurality of operation modes, a first operation in which a first image signal is read out from the image sensor by the actuator and, without being stored in the storage, processed by the image processor is performed, and a second operation in which a second image signal is read out from the image sensor by the actuator and stored in the storage before the first operation is performed and the stored second image signal is read out from the storage and processed by the image processor after the first operation is performed.

* * * * *